United States Patent [19]

Caccavale

[11] Patent Number: 5,892,937
[45] Date of Patent: Apr. 6, 1999

[54] REAL-TIME DATA CACHE FLUSHING THRESHOLD ADJUSTMENT IN A SERVER COMPUTER

[75] Inventor: Frank Samuel Caccavale, Holliston, Mass.

[73] Assignee: Digital Equipment Corporation, Maynard, Mass.

[21] Appl. No.: 757,774

[22] Filed: Nov. 27, 1996

Related U.S. Application Data

[62] Division of Ser. No. 72,613, Jun. 4, 1993, abandoned.

[51] Int. Cl.⁶ ................................................. G06F 12/12
[52] U.S. Cl. ................................................. 395/462
[58] Field of Search .................................... 395/453, 462, 395/872, 877

[56] References Cited

U.S. PATENT DOCUMENTS

| | | | |
|---|---|---|---|
| 4,750,175 | 6/1988 | Brenneman et al. | 371/22 |
| 4,821,178 | 4/1989 | Levin et al. | 395/575 |
| 4,890,227 | 12/1989 | Watanabe et al. | 364/300 |
| 4,905,171 | 2/1990 | Kiel et al. | 364/551.01 |
| 4,930,093 | 5/1990 | Houser et al. | 364/551.01 |
| 5,067,099 | 11/1991 | McCown et al. | 364/550 |
| 5,067,107 | 11/1991 | Wade | 395/500 |
| 5,109,350 | 4/1992 | Henwood et al. | 364/550 |
| 5,109,862 | 5/1992 | Kelen et al. | 128/702 |
| 5,155,824 | 10/1992 | Edenfield et al. | 395/470 |
| 5,197,127 | 3/1993 | Waclawsky et al. | 395/200 |
| 5,249,290 | 9/1993 | Heizer | 395/650 |
| 5,287,481 | 2/1994 | Lin | 395/462 |
| 5,329,619 | 7/1994 | Page et al. | 395/200 |
| 5,331,574 | 7/1994 | Temoshenko et al. | 364/551.01 |
| 5,339,430 | 8/1994 | Lundin et al. | 395/700 |
| 5,375,206 | 12/1994 | Hunter et al. | 395/200 |
| 5,459,837 | 10/1995 | Caccavale | 395/184.01 |
| 5,463,775 | 10/1995 | DeWitt et al. | 395/184.01 |
| 5,469,555 | 11/1995 | Ghosh et al. | 395/460 |
| 5,483,468 | 1/1996 | Chen et al. | 364/551.01 |
| 5,524,234 | 6/1996 | Martinez, Jr. et al. | 395/468 |

*Primary Examiner*—Thomas M. Heckler
*Attorney, Agent, or Firm*—Cathy L. Peterson; Ronald C. Hudgens; Arthur W. Fisher

[57] ABSTRACT

In a method and system for dynamically improving the performance of a server in a network, a tuning system monitors a workload of the server in real time, monitors a set of internal performance characteristics of the server in real time, and monitors a set of adjustable server parameters of the server in real time. The workload of the server may include the frequency and type of service requests received by the server from clients in the network. The internal server performance characteristics may include, for example, a data cache hit ratio of a data cache in the server. The set of server parameters may include, for example, the overall data cache size or the data cache geometry of the server. The tuning system periodically alters one or more of the set of adjustable server parameters as a function of the workload and internal performance characteristics of the server. Since the tuning system is continuously monitoring workload and performance characteristics of the server and altering the server parameters accordingly, the effectiveness of a given change in the server parameters is reflected in the next set of monitored workload and performance values.

2 Claims, 20 Drawing Sheets

```
/* set up time based sampling interval */
set_timer ():
/* point timer to timer_trigger function */
MS_WINDOWS_SET_ Timer(timer_trigger);

/* each time timer triggers we go here */
timer trigger ()
/* get this windows's moving average open file cache statistics
*/
OFC_STATS = sample_ofc_statistics ();
/* feed data to graph */
maintain_ofc_hash_graph (OFC_STATS);
/* check for dangerous growth rate of n_s */
check for danger ();
if (DANGER = = YES) {
            new_value_m = OFC_ALG1 ();
            send_new_m_to_server ();
            return;
            } */
            return; /* for next sample interval */
```

Figure 3

```
/* ********************* *
/* set up a periodic check on the data cache. point the timer to
the data cache size algorithm routine */
date_cache_timer (data_cache_size_routine);

/* ********************* *
/* when timer triggers this function is called */
data_cache_size_routine () {

/* check for asynchronous message from DC_ALG5. if
        found. preempt directly into that case */
        IsStarving = CheckForStarvation ().
        if (IsStarving = = TRUE) {
                StarveCase = GetStarveCase;
                switch (StarveCase) {
                        case DEGENERATE;
                                case_a_cache_size ().
                                default;
                                        /* let the hit ratio take over */
                                        break;
                }
        }
        /* get the current data cache statistics from the
        RTMP_DC */
        get_stats (array_stats):

Ravg = array_stats.avg_hit_ratio:
        /* switch to the appropriate version of DC_ALG2 */
        switch (Ravg) {
                case A;
                /* Ravg < = 50% */
                case_a_cache_size ();
                break;

case B;
                /* 50% < Ravg < = 80% */
                case_b_cache_size ();
                break;

case C:
                /* 80% < Ravg < = 90% */
                case_c_cache_size ();
                break;
```

*Figure 4a*

```
            case D;
                /* 90% < Ravg < = 100% */
                break:

default:
                return:
        }
        return;
}

* ********************* * case_a_cache-size () {
        /* check for degenerate system conditions */
        Sc = array_stats.current size;
        if (Sc = = Smax) {
                        /* report problem of insufficient resources
                           degenerate cache    performance state */
                        alarm (degenerate_resources);
                        return:
        }
        /* get the margin we have to work    with */
        room_left = Smax - Sc;
        /* get the current size of a cache buffer */
        Bh = array_stats.buffer_size;
        */ get the current number of cache    buffers */
        Nht = array_stats.num_buffers;

/* try a significant expansion.if possible. or else one last
        try with what ever is left*/
        new_num_buffers = 2 * Nht;
        new_cache_size = new_num_buffers * Bh:

/* make sure we have the room */ if (new_cache_size < Smax) {
                /* implement the new cache size */
                send_to_server (new cache size.
                        new_num_buffers);
                return:
        }
        else {
                /* grow as much as we can */
                new_num_buffers = (int)room_left/Bh;
                new_cache_size = new_num_buffers Bh;
                send_to_server(new_cache_size.
                        new num buffers);
                return:
        }
```

Figure 4b

```
                return
}
* ********************* * case_b_cache_size ( ) {
                default setting of ok_to_ increase should have been
        set to TRUE at initialization */

/* see if we can do anything */
        Sc = array_stats.current_size;
        if (Sc = = S max ) {
                /* report problem of insufficient resources
                degenerate cache performance state /*
                alarm (degenerate_resouces):
                return;
        }
        /* get the current size of a cache buffer */
        Bh = array _stats.buffer_size:
                get the current number of cache buffers */
        Nht = array_stats.num_buffers;

/* maintain a window of the last five values for cache hit
        ratio during the last five intervals: if these values are
        increasing or staying the same then continue
        incremental increases */
        /* most recent: t least recent t-4 */
        R2[0] = array_stats[t].hit_ratio:
        R2[1] = array_stats[t-1].hit_ratio:
        R2[2] = array_stats[t-2].hit_ratio:
        R2[3] = array_stats[t-3].hit_ratio:
        R2[4] = array_stats[t-4].hit_ratio:

/* see if at least five intervals have past and there has
        been no measureable improvement in hit ratio */
        if ( (R2[0] = = R2[1] & & R2[1] = = R2[2] etc...) & &
        (R2[0] ! = NULL & & R2[1] ! = NULL etc...){
                /* turn off increases for a while */
                ok_to_increase = = FALSE; return;
                return;
}
        /* turn back on the ability to increase cache size. if there
        has been a measureable decrease in hit ratio during any
        of the last five intervals */
        if (R2[0] < = R2[1] | | R2[1] < = R2[2]   etc.. ){
                /* turn on increases for a while */
                ok_to_increse = = TRUE;
}
```

*Figure 4c*

```
/* bounce out if tests indicate cache increases are not
producing increases in hit ratio /*
if ( ok_to_increase = = FALSE)
        return;

/* continue and get the margin we have to work with */
room_left = Smax - Sc;

/* try a moderate expansion, if possible, or else one last
try with what ever is left */
/* increase the number of cache buffers by a factor of
25%,if not possible then by as much as we have left to
work with */
new_num_buffers= 1.25 * Nht;
new_cache_size = new_num_buffers * Bh;

/* make sure we have the room */
if ( new_cache_size < Smax) {
        /* implement the new cache size */
        send_to_server (new_cache_size.
                new_num_buffers):

return:
}
else{
        /* grow as much as we can */
        new_num_buffers = (int) room_left/Bh:
        new_cache_size = new_num_buffers Bh:
        send_to_server ( new_cache_size.
                new_num_buffers):
        return;
}
return;
}
/* ******************** */
case_c_cache_size ( ) {

/* default setting of ok_to_increase should have been
        set to TRUE at utilization */

/*see if we can do anything */
        (Sc = = array_stats.current_size;
        if (Sc = = Smax) }
                /* report problem if insufficient resources
                degenerate cache performance state */
                alarm(degenerate_resources);
                return;
        }
```

*Figure 4d*

```
/* get the current size of a cache buffer /*
Bh = array_stats.buffer size:
    get the current number of cache buffers /*
Nht = array_stats.num_buffers:

/* maintain a window of the last three values for cache
hit ratio during the last three intervals: if these values
are not monotonically increasing, cease incremental
increases for a while */

/* most recent: t least recent t-2 /*
R1[0] = array_stats[t].hit_ratio;
R1[1] = array_stats[t-1].hit_ratio;
R2[2] = array_stats[t-2].hit_ratio;

if (hit_ratio[0] < = hit_ratio[1]   hit_ratio[1] < = hit _ratio[2]
            ){
            /* turn off increases for a while */
            ok_to_increase = = FALSE:
            return:
}

/* turn back on the ability to increase cache size. if there
has been a measureable decrease in hit ratio during any
of the last three intervals */
if (hit_ratio[0] < = hit_ratio[1] &&hit_ratio[1] < =
hit ratio[2] ) }
            /* turn on increase for a while */
            ok_to_increase = = TRUE:
} if (ok_to_increase = = FALSE)
            return:

/* continue to get the margin we have to work with */
room_left = Smax - Sc;

/* try a moderate expansion.if possible. or else one last
try with what ever is left */
/* increase the number of cache buffers by a factor of
10%. if not possible then by as much as we have left to
work with */
new_num_buffers = 1.10 *Nht;
new_cache_size = new_num_buffers *Bh;
```

*Figure 4e*

```
/* make sure we have the room */
if (new_cache_size < Smax ) {
            /* implement the new cache size /*
            send_to_server(new_cache_size.
                              new_num_buffers);
            return:
}
else{
            /* grow as much as we can */
            new_num_buffers = (int)room_left/Bh;

new_cache_size = new_num_buffers*Bh;
            send_to_server(new_cache_size.
                              new_num_buffers);
            return:

}
      return:
}
```

```
/* find the max sequential read measured during sample interval
*/
SRmax = find_seq_read_max ();
/* assign the optimal buffer size for seq reads */
Sb-sr = SRmax;
/* find the max sequential write measured during sample interval
*/
SWmax = find_seq_write max ();
/* assign the optimal buffer size for seq writes */
Sb-sw = SWmax;

/* determine the percent breakdown of workload */
PercentSR      = determine_percent_sr ();
PercentSW      = determine_percent_sw ();
PercentRR      = determine_percent_rr ();
PercentRW      = determine_percent_rw ();

*/ find how many modes there are in the random read histogram
*/

NMrr = find_num_modes_rr(HIST_RR [ ] );
/* find how many modes there are in the random write histogram
*/
NMrw = find_num_modes_rw(HIST RW [ ]);

/*random reads */
if (NMrr = = 1 ) {
        /* get the unimode */
        RRmode = find_unimode(HIST RR [ ] );
        /* assign optimal buffer size-unimode */
        Sb-rr = RRmode;
}
else if (NMrr > 1 ) {

/* find multi-modes */
RRmode [ ] = find_multi_modes(RRmode [ ] );
/* find the mode with the highest frequency, if a tie on
frequency, then take the one with highest frequency and
largest byte-bucket value */
/* assign the optimal buffer size for ran reads */
Sb-rr = find_best_multimode_rr(RRmode [] );
```

*Figure 6a*

```
}
else {
                /* no modes. use the byte bucket value in histogram
                        associated with the median of the random read
                distribution */
                /* find the median of random reads distribution */
                median_rr = find_median_rr(HIST_RR [] );
                /* find the byte bucket in which the median falls */ optimal_size = find_median_bucket ();
                /* assign optimal value for ran reads */
                Sb-rr = optimal_size;
}
/* random writes */
if (NMrw = = 1){
                /* get the unimode */
                RWmode = find_unimode(HIST_RW [ ]);
                /* assign optimal buffer size-unimode */
                Sb-rw  RWmode;
}
else if (NMrw > 1) {
                /* find multi-modes */
                RWmode [ ] = find_multi_modes(RWmode [ ]);
                /* find the mode with the highest frequency if a tie on
                frequency, then take the one with highest frequency and
                largest byte-bucket value */
                /* assign the optimal buffer size for ran write */
                Sp-rw = find_best_multimode_rw(RWmode[ ]);
} else{
                /* no modes. use the byte bucket value in histogram
                associated with the median of the random write
                distribution */
                /* find the median of random write distribution */
                median_rw = find_median_rw(HIST_RW[ ]);
                /* find the byte bucket in which the median falls */ optimal_size = find_median_bucket () ;
                /* assign optimal value for ran writes */
                Sb_rw = optimal_size;

/* now that the optimal buffer sizes have been assigned for the
four individual operations. merge the four tendencies into one */
/* look at the frequencies of occurrence of the four operations */
```

*Figure 6b*

```
examine_frequencies(PercentSR.Percent.SW.PercentRR.
    PercentRW);
if (mode = = unimodal) {
        /* assign the optimal cache buffer size for the
        homogenous cache as the byte bucket value associated
        with this mode */
        optimal_size = size_of_final_mode;
        Sb = optimal_size;

}
else if (final_mode ! = unimodel && (frequencies of occurrence
            of the four operations are equal) ) {
        /* Take final cache buffer size to be the largest of the
        four possible values. */
        optimal_size = find_max_size(Sb-sr,Sb-sw,Sb-rr,Sb-
                                                        rw);

Sb = optimal_size;
}
else if (final_mode ! unimodal && (frequencies of occurrence
            of the three operations are equal) ) {
        /* Take final cache buffer size to be the largest of the
        three possible values. */
        optimal_size = find_max_size(S1,Sb2,Sb3)
        Sb = optimal_size;
}
else if (final_mode = unimodal && (frequencies of occurrence
            of the two operations are equal ) ){
        * Take final cache buffer size to be the largest of the
        two possible values. */
        optimal_size = find_max_size(S1,Sb2);
        Sb = optimal size;
```

*Figure 6c*

```
SRmax = find_seq_read_max( );
/* assign the optimal buffer size for seq reads */
Sb-sr = SRmax,
/* find the max sequential write measured during sample interval
/*
SWmax = find_seq_write_max ( );
/* assign the optimal buffer size for seq writes */
Sb-sw = SWmax;

/* determine the percent breakdown of workload related to data
cache operations */
PercentSR   =   determine_percent_sr ( );
PrecentSW   =   determine_percent_sw ( );
PercentRR   =   determine_percent_rr ( );
PercentRW   =   determine  percent_rw ( );

/* find how many modes there are in the random read histogram
/*
NMrr = find_num_modes_rr(HIST RR [] );
/* find how many modes there are in the random write histogram
/*NMrw = find_num_modes_rw(HIST RW [ ] );

if (NMrr = = 1){
        /* get the unimode */
        RRmode = find_ unimode(HIST RR [ ]);
        /* assign optimal buffer size-unimode */
        Sb-rr = RRmode;
}
else if (NMrr = 1){
        /* find multi-modes */
        RRmode [ ] = find_multi_modeS(RRmode [ ] );

/* find the mode with the highest frequency, if a tie on
frequency, then take the one with highest frequency and
largest byte-bucket value */
/* assign the optimal buffer size for ran reads */
Sb-rr = find_best_multimode rr(RRmode[ ] );

}
else {
        /* no modes, use the byte bucket value in histogram
          associated with the median of the random read
          distribution */
/* find the median of random reads distribution */
median_rr = find_median_rr(HIST RR [ ] );

/* find the byte bucket in which the median falls */
```

*Figure 7a*

```
        optimal_size = find_median_bucket ( );
        /* assign optimal value for ran reads
        Sb-rr = optiimal_size;
    } if ( NMrw = = 1) {
        /* get the unimode */
        RWmode = find unimode(HIST_RW [ ] );
        /* assign optimal buffer size-unimode */
        Sb-rw = RWmode;
    }
    else if (NMrw > 1 ) {
        /* find multi-modes */
        RWmode [ ] - find_multi_modes(RWmode[ ] );
        /* find the mode with the highest frequency, if a tie on
        frequency, then take the one with highest frequency and
        largest byte-bucket value */
        /* assign the optimal buffer size for ran reads */
        Sb-rw = find_best_multimode_rw(RWmode[ ] );
    }
    else{
        /* no modes, use the byte bucket value in histogram
        associated with the median of the random read
        distribution */
        /* find the median of random reads distribution */
        median_rw = find_median_rw(HIST_RW [ ] );
        /* find the byte bucket in which the medain falls */ optimal_size = find_median_bucket ( );
        /* assign optimal value for ran writes */
        Sb-rw = optimal_size:
    }

/* now that the optimal buffer sizes have been assigned for the
    four individual operations, define the four region to the file
    server system along with the appropriate operation frequencies
    */

/* first merge the sequential read and sequential write optimal
    sizes into one optimal size. This is done to reflect the fact that
    these two operations are driven to their optimal buffer sizes by
    the same tendency */
    if (Sb-sr > Sb-sw)
            Sb-srsw = Sb-sr;
    if (Sb-sr > Sb-sw)
            Sb-srsw = Sb-sw;
    else
            Sb-srsw = Sb-sr;
```

*Figure 7b*

/* fill in the optimal cache buffer size array defining the three regions of the data cache geometry */
$S_b[0]$ = $S_{b-srsw}$;
$S_b[1]$ = $S_{b-rr}$;
$S_b[2]$ = $S_{b-rw}$;
/* fill in the array containing the definitions of how much of the data cache should be allocated to each region */
Percent [0] = PercentSR - PercentSW;
Percent [1] = PercentRR;
Percent [2] = PercentRW;

/* send to server list of the three cache buffer sizes and a list of what percent of total number of buffers each region should represent */
send_hetero_cache($S_b$ [ ], Percent [ ] );

*Figure 7c*

```
/* set up periodic checks of clean/dirty buffer ratio cache flushing */
set_timer(60secs. CheckCleanDirtyFlush ( ) );

CheckCleanDirtyFlush{
        /* periodically check the flushing rate */
        GetFlushingRateStats(&FlushStats );
        /* update the data arrays */
                UpdateArrays (numsample, &FlushStats. &Nsr [ ], &Nrr [ ]
                        &Nsw [ ],&Nrw [ ] );
        /*keep a flushes v. time graph over the ten sample interval */
        UpdateGraph(numsample, FlushStats.Nf );

/* if a threshold tendancy was previously detected in the flushing
rate.monitor it each sampling interval, rather than waiting for the
normal action interval, unit it is cleared */
if (ExpCheckOn = = YES ) {
ExpRate = = CheckFlushRate ( );
if (ExpRate = = YES ) {
        /* want to decrease the threshold to allow for more write
        activity without incurring flushing activity */
        Rprop = Nr-avg / (Nr-avg - Nw-avg);
        /* if proposed is greater than or equal to current
        threshold, decrease by 20% */
        if (Rprop > = Rc ) {
                Rprop - Rc * 0.80;
                SendTo Server(Rprop);
                return;
        }
}
ExpCheckOn = NO;
} if (NumSamples = = 10 ) {
/*if ten samples have been collected, calculate the averages */
Nr-avg = GetAverage (10 samples, &Nsr [ ], &Nrr [ ] );
Nw-avg = GetAverage (10 samples, &Nsw [ ], &Nrw [ ] );
Nf-avg = GetAverage (10 samples, Nf );
```

*Figure 8a*

```
/* check for anomalies */
/* threshold tendancy in growth of flushing rate */
ExpRate = CheckFlushRate ( );
if (ExpRate = = YES ) {
        /* set the check flag */
        ExpCheckOn = YES;
        /* want to decrease the threshold to allow for more write
        activity without incurring flushing activity */
        Rprop = Nr-avg / (Nr-avg + Nw-avg);
        /* if proposed is greater than or equal to current
        threshold, decrease by 20% */
        if (Rprop > = Rc ) {
                Rprop > = Rc *80;
                SendTo Server (Rprop);
                return;
        }
}
else {
        /* check for a NULL flush anomaly */
        if (Nf-avg = = NULL ) {
                /* leave the threshold where it is, since we are not
                flushing on the clean/dirty buffer ratio */
                return;
        }
}
/* do the normal determination of the flushing threshold */
Rprop = Nr-avg, (Nr-avg -Nw-avg);
SendToSeNer( Rprop);
return;
} return;
        }
```

*Figure 8b*

```
/* set up the sampling interval */
set_timer(cache_availability_routine. 60 seconds);

/* get measurements and keep track of the moving average of cache
availability */
cache availability routine ( ) {
        CA = GetCacheAvailFromServer ( );
        /* shift window to include most recent five values */
        CA[5]     = CA[4];
        CA[4]     = CA[3];
        CA[3]     = CA[2];
        CA[2]     = CA[1];
        CA[0]     = CA;
        /* if there is a full window get average */
        if (CA [ ] contains no null values ) {
                [CAavg = GetAvgAvail (CA [ ] );
                /* see if there is a cache availability problem */
                if (CAavg < 80% ){
                        /* post alarm to DC_ALG2 */
                        IsStarving = TRUE
                        StarveCase = DEGENERATE;
                        SendAsynchAlarm (data_cache_size_routine );
                }
                if ( 80% < - CAavg ' 9º %) {
                        /* post alarm to DC ALG2 */
                        IsStarving = TRUE;
                        StarveCase = NONDEGENERATE;
                        SendAsynchAlarm (data_cache_size_routine);

}
                /* let DC_ALG2 take care of it in its own time frame */
                else {
                        IsStarving = FALSE;
                }
        }
}
```

Figure 9

| TRIPLET No. | $RT_1$ | $RT_2$ | $RT_3$ |
|---|---|---|---|
| 1 | RESPONSE VALUE 1 | RESPONSE VALUE 2 | RESPONSE VALUE 3 |
| 2 | RESPONSE VALUE 4 | RESPONSE VALUE 5 | RESPONSE VALUE 6 |
| 3 | RESPONSE VALUE 7 | RESPONSE VALUE 8 | RESPONSE VALUE 9 |
| 4 | RESPONSE VALUE 10 | RESPONSE VALUE 11 | RESPONSE VALUE 12 |
| 5 | RESPONSE VALUE 13 | RESPONSE VALUE 14 | RESPONSE VALUE 15 |
| 6 | RESPONSE VALUE 16 | RESPONSE VALUE 17 | RESPONSE VALUE 18 |

REAL-TIME DATA CACHE FLUSHING THRESHOLD ADJUSTMENT IN A SERVER COMPUTER

This is a divisional of application Ser. No. 08/072,613, filed on Jun. 4, 1993, now abandoned.

FIELD OF THE INVENTION

The present invention is directed to a computer network and provides a dynamic method of analyzing and improving the performance of the network. More specifically, the present invention is directed to a system and method for improving the performance level of a network server by dynamically adjusting (i.e. tuning) the parameters of the server in response to changes in the workload of the server.

BACKGROUND OF THE INVENTION

In a computer network, a client (e.g. a processor or computer in the network) that wishes to obtain a particular service will generally have a wide range of available resources that are capable of performing the service. While this is advantageous, it also creates resource management problems, e.g., which one of these resources should the client utilize? In order to more efficiently provide services to a client in a network, it is known in the art to provide a server. A server is a device, generally comprising both hardware and software, which acts as an agent between the client and one or more resources to deliver a requested service to the client.

A typical server is capable of providing a plurality of services to a plurality of clients. Changes in the type and quantity of services requested necessarily affect the performance of the server by, for example, increasing the response time of the server, i.e. the time it takes the server to respond to a service request from a client. Moreover, the manner in which a server operates is, to a certain extent, dictated by a set of server parameters. The server parameters may include, for example, the data cache buffer geometry, data cache flushing rate, and open file cache timing window of the server. If the performance of a server is unacceptable, the performance may be improved by changing the server parameters in accordance with a tuning process.

In prior art systems, the server was tuned in a static manner. Specifically, the process of tuning required a person with extensive experience with the server to gather information from the system, determine what caused a performance degradation, and then propose changes in the server parameters. The server must then be shut down and restarted with the new set of parameters. Data must then be gathered and analyzed again in order to determine if the changes had the desired effect. If the performance is still unsatisfactory, the process must be repeated.

This method has obvious disadvantages. It not only requires the personal attention of a highly trained individual but also involves a time consuming process of trial and error that requires shutting down and restarting the server. It is an object of the present invention to solve these problems by providing a dynamic system for automatically tuning a server which does not require a server shutdown.

SUMMARY OF THE INVENTION

The present invention provides a system and method for dynamically improving the performance of a server in a network. The present invention accomplishes this task by dynamically changing the parameters of the server in response to changes in the server's workload.

In general, the basic data used in a performance analysis of a server is:

a) What is the work the server is asked to perform?
b) When are the clients receiving unacceptable service?
c) What are the values of the parameters of the server?
d) How do a), b), and c) change with respect to time?

In accordance with the present invention, a tuning system coupled to the server monitors the values of the server's parameters to form a state of the server and monitors the values of the server's workload to form a state of the workload. In addition, the tuning system monitors server performance. Server performance monitoring can be performed on two levels. On the first level, the tuning system monitors the server's internal functions by retrieving information regarding internal performance characteristics such as the data cache hit ratio. On the second level, the tuning system periodically makes service requests to the server and measures the server's response time with respect to these requests.

In accordance with the present invention, if the tuning system determines that the performance of the server is unacceptable, it will automatically alter the server parameters (the server state), taking into account the server's workload, in order to improve the server's performance. If the tuning system determines that the server's performance cannot be improved by a change in the server state, it will set an alarm to alert the system manager to the problem.

In accordance with the present invention, the tuning system monitors the workload of the server, the server parameters, and the server's performance. The tuning system utilizes the relationship between server parameter, server workload, and server performance to automatically and continuously match the server's state to the workload it must service in order to maintain an acceptable level of performance.

In accordance with an exemplary embodiment of the present invention, the tuning system allows for internally generated performance thresholds as well as user defined performance thresholds. The tuning system monitors the server's performance and changes the server's parameters to insure that the server remains within the permissible thresholds despite workload changes. This feature allows the user to define a higher (or lower) level of performance for the server depending upon the needs of the network.

In accordance with the present invention, the tuning system operates to continually match the server state to the workload demand which the server must service. In order to accomplish this task, the tuning system utilizes a set of micro-level algorithms and a set of macro-level algorithms.

The micro-level algorithms perform dynamic tuning by recognizing changes in the workload state (or monitored performance values) and, in response thereto, applying appropriate changes to the server parameters in an attempt to mediate adverse performance effects. Micro-level algorithms operate on those server parameters which explicitly address singular behaviors in the server, such as the data cache flushing rate, the open file cache time window, the data cache geometry of buffers, etc.

In accordance with an embodiment of the present invention, a set of micro-level algorithms is provided for each tunable parameter of the server. In general, a micro-level algorithm effecting changes in one of the server parameters is intended to affect only that parameter. For example, the micro-level algorithm which targets the open file cache time window takes in only arguments which are inherent in the design and function of the open file cache. It therefore effects changes in this parameter based solely on this data, not intending to explicitly effect changes in other parts of the server (although this might occur under certain circumstances). The dynamic tuning of the server is based upon a foundation of several such micro-level algorithms, all working independently on various sub-systems in the server and trying to dynamically match state transitions in the workload to performance-compensating transitions in each targeted sub-system.

In an embodiment of the present invention, the micro-level algorithms target the open file cache and data cache of the server. With regard to the open file cache, the tuning system monitors server performance characteristics and alters server parameters relating to the hashing table and close file delay. With regard to the data cache, the tuning system monitors server performance characteristics and alters server parameters relating to the hashing table, data cache size, data cache geometry, and data cache flushing rates.

The macro-level algorithms relate to the overall state of the server and workload rather than the individual server parameters. The changes in server parameters made by the micro-level algorithms translate into changes in the server state. The macro-level algorithms map the changes in the server state to changes in the server workload and in the server's performance in responding to that workload. In this manner, the macro-level effect of the micro-level dynamic tuning translates into an observable dynamic tuning of overall server performance which maps a state transition of the server to a corresponding state transition in the workload.

The macro-level algorithms create a representation of overall behavior of the server from the micro-level data and use this behavior to address macro-level phenomena such as performance and capacity saturation. This representation of overall server behavior is also used to allow a system user to monitor the behavior of the server as a whole and the effectiveness of the micro-level algorithms in tuning the server.

In accordance with an exemplary geometrical modelling technique, the tuning system uses macro-level algorithms to create a three dimensional surface which represents the relationship between the server's workload, the amount of server resources consumed by the workload, and the performance of the server in response to the workload. In accordance with this embodiment, an enumeration technique provides unique values along a first axis representing the server's workload. A system resource characteristic (e.g. CPU utilization) is plotted along a second axis for each unique workload value and a server performance metric (e.g. the server's average response time to client requests) is plotted on a third axis for each unique workload value. Thus, the performance and resource utilization of the server, for all possible workload values, is plotted to create a three dimensional representation, or surface topology, of the server.

The tuning system monitors the workload, resource utilization, and server performance and maps the current values onto the surface topology of the server to determine the current position of the server on the surface topology. As the workload changes, the current position of the server on the surface topology also changes. Therefore, as the workload changes over time, the system according to the present invention tracks the motion of the server over the surface topology and displays it to the user. Moreover, since the server's surface topology represents the entire universe of possible resource/workload/performance combinations, it is possible, by examining the server's recent positions on the surface topology, to identify not only the current resource/workload/performance information but also to predict, to a certain extent, future performance information based upon trends in the workload.

In another embodiment of the present invention, the macro-level algorithms are used to track the entropy of the server. Ideally, the response time of a server to a particular service request should not vary over time. To the extent that the server's response time does vary over time, the server is demonstrating entropic behavior. The tuning system measures the response time of the server by performing server primitive operations on the server and measuring the server's response time. As will be discussed further below, the tuning system may also use a set of probes located in clients in the network to measure the server's response time in the same manner. The tuning system derives a value for the entropy of the server from these measured response time values and plots these entropy values on a graph as a function of time. If the system detects an abrupt increase in the entropy in a short time interval (i.e., saturation behavior), the system will set an alarm to the user.

In a further embodiment of the present invention, the tuning system analyzes the response times of the server and warns the user when the response times are beginning to exhibit saturation behavior. The tuning system determines when a server is approaching saturation behavior by plotting "triplets" of measured response times ($RT_1$, $RT_2$, $RT_3$), i.e. three consecutive response times, on a three dimensional graph. A response time saturation value $RT_{sat}$ is defined as the response time at which the server begins to exhibit saturation behavior. The maximum permissible response time is plotted on the graph as a cube having sides of length $RT_{sat}$. It has been empirically determined that the set of triplets measured over time will typically be bounded by a sphere of radius $r_b$. In accordance with the present invention, the rate at which the sphere is approaching the cube of length $RT_{sat}$ is identified and reported as the rate at which the server is approaching saturation behavior (i.e. one hour to saturation). As a result, the tuning system can set an alarm indicating that the server is approaching saturation behavior when this rate drops below a threshold value.

BRIEF DESCRIPTION OF THE DRAWINGS

FIG. 3 is an illustrative computer program for implementing Open File Cache Hashing Table Micro-algorithm according to the present invention.

FIG. 4(a–f) is an illustrative computer program for implementing a Data Cache Size Micro-algorithm according to the present invention.

FIG. 6(a–c) is an illustrative computer program for implementing a Data Cache Homogeneous Geometry Micro-algorithm according to the present invention.

FIG. 7(a–c) is an illustrative computer program for implementing a Data Cache Heterogeneous Geometry Micro-algorithm according to the present invention.

FIG. 8(a–b) is an illustrative computer program for implementing a Data Cache Flushing Micro-algorithm according to the present invention.

FIG. 9 is an illustrative computer program for implementing a Data Cache Buffer Starvation Micro-algorithm according to the present invention.

DETAILED DESCRIPTION OF THE DRAWINGS

Figure 1:
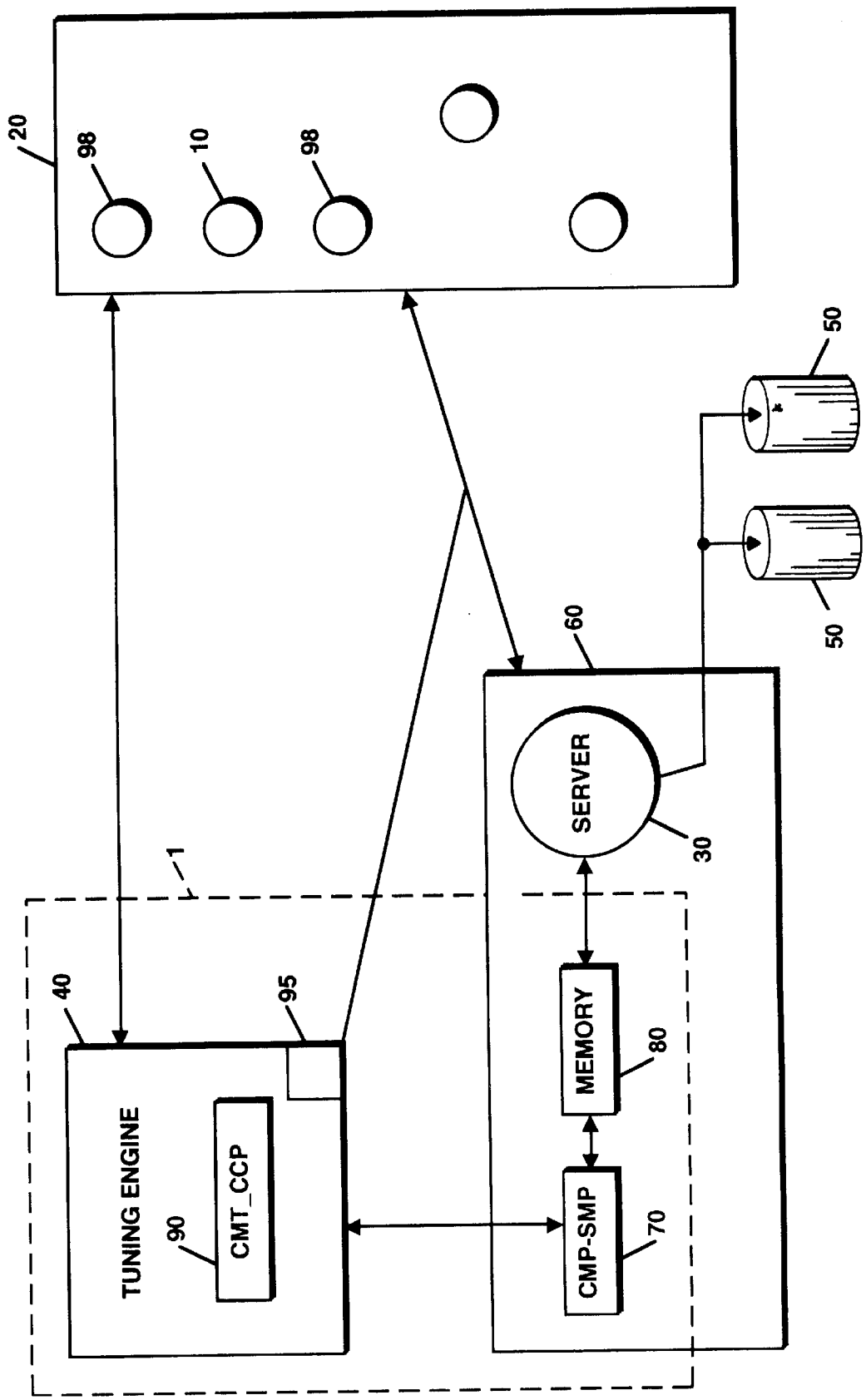
FIG. 1 shows a network including a tuning system according to the present invention.

A tuning system 1 according to the present invention is illustrated in FIG. 1. The tuning system 1 uses a tuning engine 40 to dynamically tune the parameters of a server 30 in response to changes in the server's workload. The server 30 typically resides in a host system 60 and is coupled to a plurality of clients 10 in a client population 20 and to one or more resources 50. The Tuning engine 40, which is coupled to the server 30, monitors the workload and internal performance characteristics of the server 30, periodically determines the response time of the server to service requests, and changes the server parameters of the server in response to changes in the workload and internal performance characteristics.

The data gathered during the tuning process, which is stored in a memory 80 of the host system 60, is also used to generate a graphical representation of server performance as a function of server capacity and workload, and to alert a user to performance and capacity saturation. In order to accomplish these tasks, the tuning engine 40 utilizes a set of micro-level algorithms and a set of macro-level algorithms.

I. Micro-level Algorithms

In accordance with an embodiment of the present invention, the tuning engine 40 tunes the server through the use of several sets of micro-level algorithms. The micro-level algorithms perform dynamic tuning by recognizing changes in the workload and internal performance characteristics of the server and, in response thereto, applying appropriate changes to the server parameters in an attempt to mediate adverse performance effects. Micro-level algorithms operate on those parameters which explicitly address singular behaviors in the server. Therefore, an algorithm effecting changes in one of the parameters does not intend to explicitly effect changes in other parts of the server (although this might occur in certain situations).

There are many server parameters which may affect the performance of a server. In accordance with an embodiment of the present invention, several server parameters, including, e.g., data cache flushing rates, open file cache timing windows, and data cache geometry, together compose the state of the server. This does not imply that these are the only parameters which can define the state of a server system. Indeed, different types of server's may have different sets of server parameters. Moreover, with regard to any particular server, some or all of the server parameters which affect server performance may be used in the tuning process.

In accordance with an illustrative embodiment of the present invention, however, the data cache flushing rates, open file cache timing windows, data and open file cache hashing tables, and data cache geometry comprise the representation of the server's state for which a mapping to the workload has been identified.

Each of the server parameters which comprise the server state has been found to be amenable to dynamic tuning based on state transitions of the workload. Each of these tunable server parameters has a corresponding algorithm (or set of algorithms) which governs its value and transition sequence. When collected as a set, these parameters define the server state for purposes of dynamic tuning. Each algorithm, while unique to the particular type of target system, shares the following basic structure:

```
: : : >  an observable perturbation in the workload
: :
: :     : : > causes : : >
: :         an identifiable change in the parameter which
: :         tends to compensate for the perturbation
: :
: :         : : : > feedback on actual result of the
: :                  compensating action>: : : : :
: :                                    : :
: : : : : : : : : : : : : : : : : : : : : : : : : : : : : : : : :
```

Each of the micro-level algorithms contains a "sampling interval" or time during which needed statistical data are retrieved from the server by the tuning engine 40 in a non-reduced state and prepared for use by the micro-level algorithms. Thus, a sampling interval of two seconds indicates that data are sampled from the server every two seconds. Each micro-level algorithm also contains an "action interval" or time in between transmission of tuning recommendations from the tuning system 1 to the server, i.e. the processing time of the algorithm. An action interval of five seconds, for example, indicates that the parameter is updated every five seconds. The sampling interval and action interval for a given micro-algorithm is a matter of design choice to be selected by the system designer. The specific intervals indicated in the discussion that follows are merely exemplary values which have been found to be acceptable.

A. RTMP's: Real-Time Monitoring of Critical Values

The tuning engine's micro-level algorithms depend upon having real-time monitoring data concerning the server's internal behavior. This is accomplished through the actions of the Real Time Monitoring Processes (RTMP's). The server systems which are targeted by the tuning engine 40 are configured in such a way that the salient statistics needed by the micro-level algorithms's are constantly sampled and made available to the tuning engine 40.

The various server sub-systems monitor the needed statistics and periodically communicate the data to the Server Monitor Process (CMT_SMP 70) which reduces data when necessary and stores the data in the memory 80 of the host system 60. The Central Client Process (CMT_CCP 90), which resides in a Microsoft Windows program on the tuning engine 40, communicates with the CMT_SMP 70 via a communication protocol (e.g. NetBios). In this manner, CMT_CCP 90 periodically assimilates the data from the RTMP's into the micro-algorithms. Once the algorithms act on the data, the changes deemed necessary are communicated back to the CMT_SMP 70 which places them into memory 80. The changes are then periodically communicated back to the server.

In the server 30, the changes recommended by algorithms are implemented, thereby effecting state transitions in the server. In the discussion that follows, it should be understood that any values retrieved from the server (e.g. data cache hit ratio, number of sequential reads) are retrieved and processed by RTMP.

B. Open File Cache Micro-level Algorithms

The open file cache is a mechanism in the server which attempts to improve performance on file open requests by maintaining pertinent file header information in memory after a particular client has requested that the file in question be closed. This is accomplished by actually keeping the file open in the file system while telling the client which requested the file close operation that the close was actually performed. In effect, the actual file close operation is delayed a certain period of time (designated the "close delay time interval") by the open file cache. When a client closes a file and then re-opens the file during the close delay time interval, the server avoids the expense of an actual file open because it has retained the pertinent information in memory.

Figure 2:
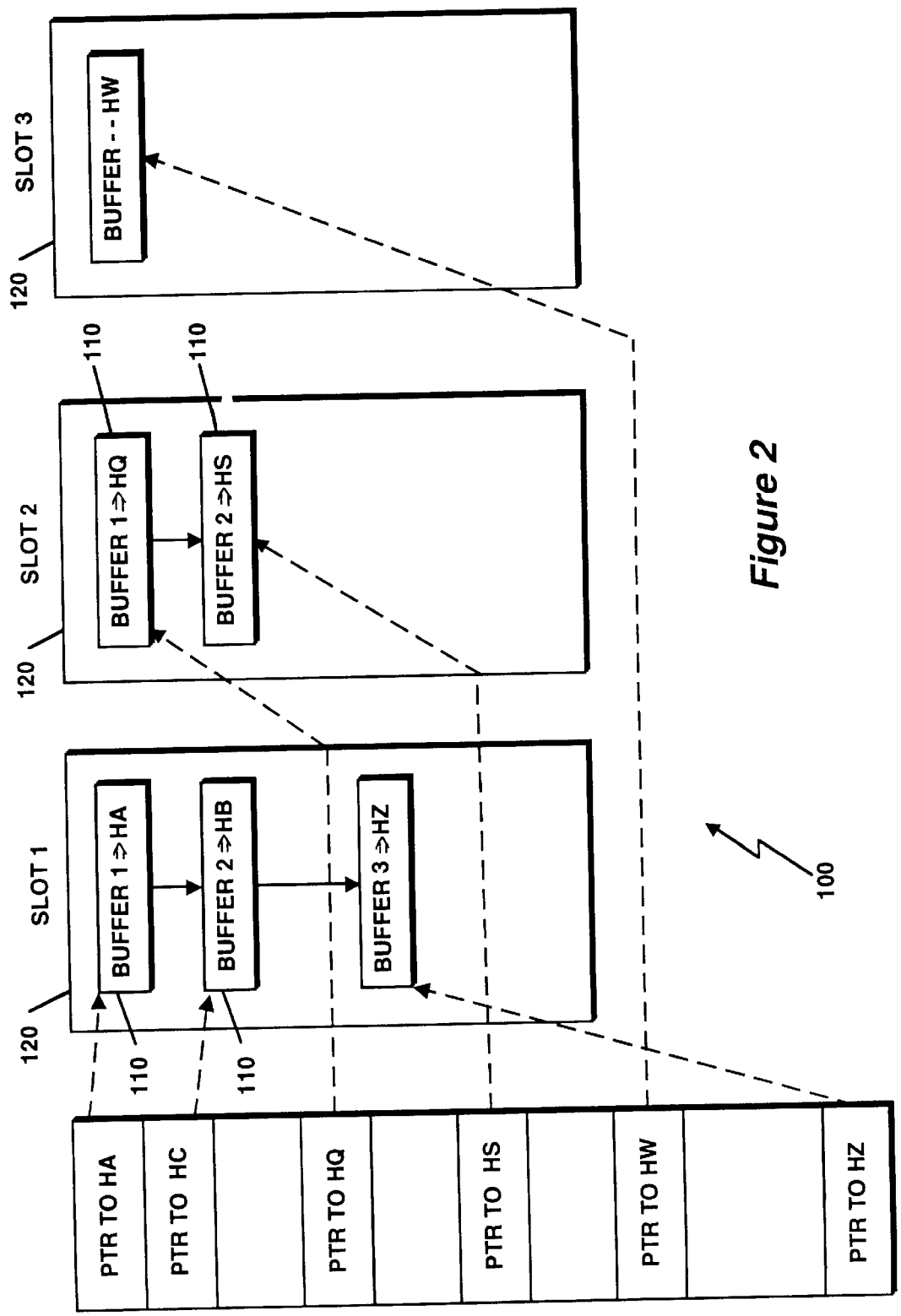
FIG. 2 illustrates a hashing table.

The data structures which contain the file header information are maintained in memory buffers which are accessed through a hashing table. Referring to FIG. 2, a hashing table mechanism 100 allows for chaining of a plurality of buffers 110. Each buffer 110 contains the file header information for one file. When the server wishes to access the file header information for a particular file, the file header I.D. is used to access a pointer which indicates which slot 120 of buffers contains the file header information. Once the slot 120 has been identified, the chain of buffers 110 for that slot must be searched in order to find the buffer 110 which contains the file header information.

The open file cache is tuned by two micro-level algorithms OFC_1 and OFC_2. These algorithms can be implemented with a sampling interval of 60 seconds and an action interval equal to five sampling intervals (300 seconds).

In analyzing the performance of the hashing table, there are several statistics of interest. The load factor, (a), is defined as the average number of elements stored in a chain (a=n/m), where n=number of file header structure elements stored by the hashing table;

m=number of hash table slots 120 used to store the file header structure elements.

The average number of elements that must be examined in a successful search, ($n_s$), is defined by the equation: $n_s=1+(a/2)-(1/2m)$. OFC_1 attempts to tune the server by controlling the growth of $n_s$.

With regard to the close delay time window, i.e. the amount of time a file is kept open after a client requests that it be closed, the following variables are of interest:

File Close Delay ($W_d$):
    the time interval (in seconds), measured by the server from the time the client requests that a file be closed, during which the file is actually kept open with the file header information resident in memory (the open file cache). After the expiration of this interval, if no interceding request to re-open the file has been processed, the file is actually closed by the server. If a request does come in to reopen the file, the file close delay is reset.

Number of Open Files ($F_o$):
    the moving average (over the five most recent sampling intervals) of the total number of files which the server has maintained as open on behalf of client requests. For any particular sampling interval in the window of this moving average: $F_o=F_i+F_a$ Number of Idle Files ($F_i$):
    the moving average (over the five most recent sampling intervals) of the number of files which the server has maintained as open during the last sampling period, but which have actually been requested to be closed by the clients. These files are the contents of the open file cache.

Number of Active Files ($F_a$):
    the moving average (over the five most recent sampling intervals) of the number of files which the server maintained as open during the last sampling period, and which have not been closed by clients during that period.

Number of idle files which changed from idle to active ($F_{IA}$):
    the moving average (over the five most recent sampling intervals) of the number of files which have moved from the idle list to the active list. The rate at which this motion occurs is the tuning system's measure of the effectiveness of the open file caching scheme in the server.

1. Open File Cache Hashing Table Algorithm (OFC 1)

OFC_ALG1 monitors and acts upon the open file cache hashing table's effectiveness by monitoring the variable, $n_s$ (the average number of elements that must be examined in a successful search). The tuning system 1 samples $n_s$ periodically and computes a value $n_{s-avg-t}$, which is the moving average of $n_s$ over the five most recent sampling intervals. It also maintains an internal representation of the map of $n_{s-avg-t}$ as a function of time. When the tuning engine 40 detects saturation behavior in the values of $s_{s-avg-t}$, OFC_ALG1 attempts to move $n_{s-avg-t}$ back into a linear region. Under normal conditions, $n_{s-avg-t}$ will remains relatively constant over time. As the saturation value is approached, however, $n_{s-avg-t}$ will suddenly grow. This saturation value is sometimes referred to as the "knee of the curve" and the manner in which it is detected is discussed below in Section II(c) and in copending application Ser. No. 08/050,929 which is incorporated herein by reference. In any case, when OFC_ALG1 detects saturation behavior, it attempts to compensate by changing the number of hash table slots (m).

Referring to the illustrative computer program of FIG. 3, OFC_ALG1 periodically samples n, and generates a value $n_{s-avg-t}$ (OFC_STATS), which is the moving average of $n_s$ during the five most recent sampling intervals measured from time "t". This value is periodically plotted on a graph as a function of "t" (maintain_ofc_hash_graph (OFC_STATS)). Each time a new value of $n_{s-avg-t}$ is plotted, OFC_ALG1 checks the graph to see if $n_{s-avg-t}$ is exhibiting saturation behavior (check for danger( )). If saturation behavior is detected, OFC_ALG1 selects a value of $n_{s-avg-t}$ from a recent "linear" portion of the $n_{s-avg-t}$ vs. time curve and, using:

a) this "linear" $n_{s-avg-t}$; and b) the most recently sampled value for n; solves the $n_s$ equation for m (new_value_m). This new value for m is sent to the server via CMP_SMP and the server implements the change during its next state transition (send_new_m_to_server( )).

2. Open File Cache Close Delay Algorithm (OFC ALG2)

OFC_ALG2 monitors and acts upon the open file cache's file close delay value ($W_d$) which is the amount of time the cache keeps a file open after receipt of a file close request from a client. The server maintains an internal default value for $W_d$ ($W_{do}$). In accordance with OFC_ALG2, the tuning engine 40 monitors, during each action interval, the total number of open files ($F_o$), the number of open files that are idle ($F_i$), the number of open files which are active ($F_a$), and the number of idle files that have become active ($F_{IA}$), and manipulates $W_d$ accordingly. In accordance with the algorithm, the open file cache is placed in one of 5 defined "cases" (a–d) as follows:

|    | $F_o$ | $F_i$ | $F_a$ | $F_{IA}$ |
|----|-------|-------|-------|----------|
| a) | =0    | =0    | =0    | =0       |
| b) | >0    | =0    | >0    | =0       |
| c) | >0    | >0    | >0    | =0       |
| d) | >0    | >0    | >0    | >0       |
| e) | >0    | =0    | >0    | >0       |

If the open file cache is in case (a), there has been no file open activity during the action interval (t). This is the trivial case in which OFC_ALG2 sets the value for open file close delay during the next action interval to be the default value: $W_d(t+1)=W_{dO}$ If the open file cache is in case (b), then all the open files during this action interval were in the active state. None of the files were idle. Therefore, open file caching was not a factor during this action interval because none of the clients requested that an open file be closed. In this case, OFC_ALG2 will set the file close delay during the next interval to be the default value: $W_{d(t+1)}=W_{dO}$ If the open file cache is in case (c), then some of the open files have been closed by clients during the previous action interval. The open file cache, however, has kept these files "open" during the close delay time period in the hope that these files might be reopened before the close delay period expired. Since there has been no idle->active motion during the previous action interval, however, none of the closed files were reopened during the close delay period.

This situation could indicate the close delay time period is too short. To test this hypothesis, OFC_ALG2 checks to see if this instance of case "c" is one of a sequence of three (3) successive instances of case "c" for which it is testing this hypothesis. If this is the situation, then OFC_ALG02 will increase the value of the close delay interval by a random integral multiple of the default value such that $W_{d(t+1)}$=random; wherein $W_{d(t)}$<random<=$(5*W_{dO})$.

If, however, this instance of case "c" is one of a sequence of at least five previous successive instances of case "c" in which $W_d$ was set to a random integral multiple of $W_{dO}$ (as defined above), then OFC_ALG2 will conclude that the workload is not amenable to open file caching and will reset the close delay to the default setting: $W_{d(t+1)}=W_{dO}$.

If the open file cache is in case (d), then some of the open files were actually closed by the clients; kept open in an idle state; and then reopened by the clients during the close delay period. In this situation, a longer close delay might produce a still higher rate of idle->active motion. To explore this possibility, OFC_ALG2 will increase the close delay value by a random amount ($W_{d(t+1)}$=random*$W_{dO}$, where $W_{d(t)}$<random<=$(5*W_{dO})$), unless it had previously attempted an increase during the last interval. If an increase was attempted in the last interval, the close delay is left unchanged (if $W_{d(t-1)}<W_{d(t)}$, then $W_{d(t+1)}=W_{d(t)}$).

If the open file cache is in case (e), then every file that was closed by a client during the previous action interval, and kept open by the open file cache, was reopened by the client before the expiration of the close delay. In this case, OFC_ALG2 determines that the close delay is set at its optimal value (since there are only active files with motion from the idle to active list and no files left over on the idle list) and $W_d(t+1)=W_d(t)$.

C. Data Cache Micro-Algorithms

The data cache is one of the most important performance enhancement mechanisms in the server. It is tunable on several parameters: its size, its buffer geometry, its hashing table, and its flushing intervals. The tuning system 1 periodically samples specified statistics of interest (detailed below) and not only maintains values for these statistics for each sampling interval but also maintains a moving averages of these statistics over a window of the five most recent sampling intervals.

The data cache is a system of discrete regions of mapped memory (data cache buffers) into which data can be read or written. Therefore, increasing or decreasing the data cache size is effected by increasing or decreasing the number of data cache buffers which comprise the data cache.

The cache geometry of a data cache can be either homogeneous of heterogeneous. A data cache with a homogenous geometry is comprised of a set of cache buffers of identical sizes (in bytes). In contrast, a data cache with a heterogenous geometry is comprised of a set of cache buffers of non-identical sizes such that the overall cache is broken up into several regions, each region characterized by a different buffer size. Within each region of a heterogeneous data cache, the geometry is homogenous, but across regions the geometry is heterogenous.

1. Data Cache Hashing Table Algorithm (DC ALG1)

The data cache, like the open file cache, has a hashing table which is amenable to dynamic tuning. DC_ALG1 monitors and acts upon the data cache hashing table's effectiveness in precisely the same manner in which OFC ALG1 acts upon the open file cache hashing table.

2. Data Cache Cache Size Algorithm (DC ALG2)
a. Homogenous Data Cache

DC_ALG2 will be initially described with reference to a homogenous data cache. DC_ALG2 acts on the data cache statistics relating to the data cache size, and on input from DC_ALG5 regarding cache availability, to determine the optimal number of buffers which should make up the data cache. In DC_ALG2, only the overall cache size is varied. The cache geometry is kept constant. DC_ALG2 has a sampling interval of 60 seconds and an action interval equal to 60 sampling intervals (1 hour). The following variables can be used to implement this algorithm:

Maximum size for data cache $S_{max}$:
  the maximum size to which the data cache can be grown. This value is either calculated by the tuning system 1 during the initial system configuration or is a user-defined value.

Current size of the data cache $S_c$:
  the current size of the data cache in bytes (the sum of the sizes of all the data cache buffers).

Maximum number of buffers in the data cache (homogenous cache) $N_{ht}$:
  the total number of buffers in a homogenous data cache (all buffers identical size).

Size of a buffer in an homogenous data cache $B_h$:
  the size in bytes of a buffer in a homogenous data cache (all buffers in cache identical size).

Maximum number of buffers in the small buffer pool (heterogenous cache)$N_s$:
  the total number of buffers in the small region of a heterogenous data cache (all buffers in the small region are identical size).

Maximum number of buffers in the medium buffer pool (heterogenous cache) $N_m$:

the total number of buffers in the medium region of a heterogenous data cache (all buffers in the medium region are identical size).

Maximum number of buffers in the large buffer pool (heterogenous cache) $N_l$:
the total number of buffers in the large region of a heterogenous data cache (all buffers in the large region are identical size).

Size of a buffer in the small region of a heterogenous data cache $B_s$:
the size in bytes of a buffer in the small region of a heterogenous data cache (all buffers in region of identical size).

Size of a buffer in the medium region of a heterogenous data cache $B_m$:
the size in bytes of a buffer in the medium region of a heterogenous data cache (all buffers in region of identical size).

Size of a buffer in the large region of a heterogenous data cache $B_l$:
the size in bytes of a buffer in the large region of a heterogenous data cache (all buffers in region of identical size).

Data Cache Hit Ratio $R_{avg}$:
the moving average (over the five most recent sampling intervals) of the cache hit ratio, where the cache hit ratio is the ratio of number of requests for data to the number of those requests which were satisfied by data in the data cache buffers.

Hit Ratio Window-1 R1 [3]:
An array of the cache hit ratios from the last three sampling intervals.

Hit Ratio Window-2 R2[5]:
An array of the cache hit ratios from the last five sampling intervals.

Data Cache Hit Ratio $R_{avg}$[small]:
the moving average (over the five most recent sampling intervals) of the cache hit ratio in the "small" buffer region of the heterogenous data cache.

Data Cache Hit Ratio $R_{avg}$[medium]:
the moving average (over the five most recent sampling intervals) of the cache hit ratio in the "medium" buffer region of the heterogenous data cache.

Data Cache Hit Ratio $R_{avg}$[large]:
the moving average (over the five most recent sampling intervals) of the cache hit ratio in the "large" buffer region of the heterogenous data cache.

As previously mentioned, DC_ALG2 acts on the data cache statistics relating to data cache size (which is sampled from the server by the tuning system 1) and from input regarding cache availability (which, as explained infra, is obtained from DC_ALG5) in order to determine the optimal number of buffers which should make up the data cache size. Referring to FIG. 4, DC_ALG2 uses the value $R_{avg}$ (data cache hit ratio) to place the data cache in one of the following four cache performance states (a–d):

a) $R_{avg} <= 50\%$
b) $50\% < R_{avg} <= 80\%$
c) $80\% < R_{avg} <= 90\%$
d) $90\% < R_{avg} <= 100\%$ Case (a) is treated as the degenerate state. The cache hit ratio is unacceptable and the cache size must be significantly increased (if possible). Therefore, when DC ALG2 detects a first instance of case (a) (case_a_cache-size( )), it increases the number of cache buffers by 100% (or to $S_{max}$ if a 100% increase will exceed $S_{max}$). This procedure is repeated for each successive instance of case (a) until:

1) the hit ratio improves enough to move the cache into another cache performance state (i.e., hit ratio improves >50%); or
2) the memory resources on the server system cannot support any further cache size increases. In this case, an alarm (alarm (degenerate_resources)) is set to alert the central user that the data cache cannot support the workload with adequate performance unless the server is equipped with adequate resources to increase the size of the data cache.

Case (b) indicates that the data cache has a "low" to "moderate" cache hit ratio (case_b_cache-size( )). Therefore, DC_ALG2 issues a series of gradual, rather than dramatic, cache size increases. It has been empirically demonstrated that cache buffer management is a measurable overhead for the server system which can adversely affect data cache performance. Moreover, an increase in data cache size does not necessarily result in an increase in the hit ratio because the workload-driven pattern of data cache accesses combined with the cache's data replacement mechanism might prevent the hit ratio from tracking cache size. Therefore, increasing the size of the cache without regard to the corresponding rate at which the hit ratio is increasing might result in both an unnecessary use of resources and a decrease in cache performance. To avoid such a result, DC_ALG2 attempts modest (25%) successive increases in the number of cache buffers while simultaneously monitoring the resulting hit ratio changes ($1.25*N_{ht}$). If DC_ALG2 determines that the modest increases in cache size during the last five sampling intervals R2[5] have not produced any measurable increases in the hit ratio, then it stops increasing the cache size until the hit ratio begins to deteriorate, at which time incremental increases are resumed.

Case (c) indicates that the data cache has a "good" cache hit ratio (case_c_cache-size( )). The algorithm used for case (c) is similar to the implementation in case "b" with the following two differences:

1) The incremental increases are more "gradual", 10% rather than 25%; and
2) The cessation of incremental increases is more rigid. In accordance with case (c), cache size increases are inhibited if the hit ratios has failed to increase in any of the last three successive sampling intervals R1 [3]. Cache size increases resume, however, if the hit ratio has failed to increase in all of the last three successive intervals.

Case (d) indicates that the data cache has an "excellent" cache hit ratio (case_d_cache-size( )). In case (d) DC ALG2 simply leaves the cache size at its current value.

As previously mentioned, DC_ALG2 also utilizes input relating to data cache availability in determining the optimal data cache size. Data cache availability is defined as the ratio of the number of times the data cache had to be flushed in order to free up a data cache buffer to satisfy a read or write request from a client to the total number of reads and writes from clients during a sampling interval. DC_ALG5, described below and in FIG. 9, monitors the data cache availability and asynchronously sends DC_ALG2 a command instructing it to bypass its normal procedures and implement a specified case based upon the data cache availability monitoring conducted by DC_ALG5 (CheckForStarvation). Thus, DC_ALG5 overrides the normal action interval of DC_ALG2 and forces DC_ALG2 to alter the cache size before it normally would.

b. Heterogeneous Data Cache

With regard to a heterogeneous data cache, DC_ALG2 is applied simultaneously to each of the regions of the heterogeneous data cache. In this manner, each region is treated as a homogenous data cache within a larger heterogeneous super-set. As a result, the size of each region is optimized in accordance with DC_ALG2 independent of the other regions in the heterogeneous data cache.

3. The Data Cache Buffer Geometry Algorithms: DC ALG3a & DC ALG3b

The data cache buffer geometry algorithms are designed to adjust the uniform cache buffer size in the homogenous cache (DC_ALG3a) and the regional cache buffer sizes in the heterogenous cache (DC_ALG3b) to optimal sizes. The tuning system 1 performs real-time monitoring of workload (via RTMP) for use by these algorithms. These algorithms also utilize the real time data sampled by the tuning system 1 for use by DC_ALG2.

The tuning system 1 assimilates workload data measured during the sampling intervals into frequency distribution histograms for each of the following operations: sequential reads, sequential writes, random reads, and random writes. These histograms map the frequency of occurrence of each operation into pre-defined byte-buckets. The byte-bucket sizes (or combinations of these sizes) provide the discrete values which are considered by the algorithms as possible cache buffer sizes. The result of these algorithms is to optimally map the buffer cache geometry during a certain period of time to the workload state during that period of time. DC_ALG3a and 3b use a sampling interval of 60 seconds and an action interval equal to 60 sampling intervals (1 hour). In implementing their functions, these algorithms utilize the following variables:

$S_b$: the size (in bytes) of a cache buffer in the homogenous cache geometry.

$S_b[]$: an array of the sizes (in bytes) of the cache buffers in the heterogenous cache geometry.

$S_{b-sr}$: the optimal cache buffer size for the sequential reads.

$S_{b-rr}$: the optimal cache buffer size for the random reads.

$S_{b-sw}$: the optimal cache buffer size for the sequential writes.

$S_{b-rw}$: the optimal cache buffer size for the random writes.

$S_{b-srsw}$: the optimal cache buffer size resulting from the merging of $S_{b-sr}$ and $S_{b-sw}$ in the heterogeneous cache geometry.

$SR_{max}$: the size of the maximum byte bucket used in the sequential read frequency distribution histogram measured for sequential reads during the sample interval.

$SW_{max}$: the size of the maximum byte bucket used in the sequential write frequency distribution histogram measured for sequential writes during a sample interval.

$RR_{mode}$: the mode of byte-buckets in the frequency histogram (unimodal distribution) for random reads during a sample interval.

$RW_{mode}$: the mode of byte-buckets (unimodal distribution) for random writes during a sample interval.

$RR_{mode}[]$: array of the modes of the byte-buckets (multi-modal distribution) for random reads during a sample interval.

$RW_{mode}[]$: array of the modes of byte-buckets (multi-modal distribution) for random writes during a sample interval.

$NM_{rr}$: the number of modes (local peaks in the histograms) in the random read histograms during a sample interval.

$NM_{rw}$: the number of modes (local peaks in the histograms) in the random write histograms during a sample interval.

HIST_SR[]: the frequency histogram of sequential reads during the sample interval provided by the tuning engine 40. In this histogram, frequencies of occurrence are maintained for random reads in byte-buckets with values of 1)8 bytes (0–7), 2)16 bytes (8–15), 3)32 bytes(16–31), 4)64 bytes(32–63), 5)128 bytes (64–127), 6)256 bytes(128–255), 7)512 bytes (256–511), 8)1024 bytes (512–1023), 9)2048 bytes (1024–2047), 10)4096 bytes (2048–4095), 11)8192 bytes (4096–8191), 12)16384 bytes (8192–+++).

HIST_RR[]: the frequency histogram of random reads during the sample interval provided by the tuning engine 40. In this histogram, frequencies of occurrence are maintained for random reads in byte-buckets of the same size as HIST_SR[].

HIST_SW[]: the frequency histogram of sequential writes during the sample interval provided by the tuning engine 40. In this histogram, frequencies of occurrence are maintained for random reads in byte-buckets of the same size as HIST_SR[].

HIST_RW[]: the frequency histogram of random writes during the sample interval provided by the tuning engine 40. In this histogram frequencies of occurrence are maintained for random reads in byte-buckets of the same size as HIST_SR[].

PercentSR: the percent of the total reads and writes during a sample interval which were sequential reads.

PercentRR: the percent of the total reads and writes during a sample interval which were random reads.

PercentSW: the percent of the total reads and writes during a sample interval which were sequential writes.

PercentRW: the percent of the total reads and writes during a sample interval which were random writes.

a. Homogenous Geometry: DC_ALG3a

This algorithm determines the optimal size, $S_b$, for a data cache buffer when all data cache buffers must be the same size. The optimal cache size is a function of the type of data accesses requested of the cache (e.g. sequential reads v. sequential writes) and of the size of the data accesses (in bytes) within each of these types. For example, during a given sample interval, sequential reads tend to push the optimal cache size ($S_b$) towards the value of the maximum byte bucket ($SR_{max}$) used in the sequential read frequency distribution histogram for that sample interval. Similarly, sequential writes tend to push $S_b$ toward $SW_{max}$. At the same time, the random reads are moving the value for $S_b$ towards a value of $RR_{mode}$ or a combination of the values of $RR_{mode}[]$ (depending upon the frequencies of distribution). Finally, random writes are pushing the values of $S_b$ toward $RW_{mode}$ or a combination of $RW_{mode}[]$. DC_ALG3a uses all of these values in synthesizing the optimum value for the data cache buffer size.

Figures 4F, 5:
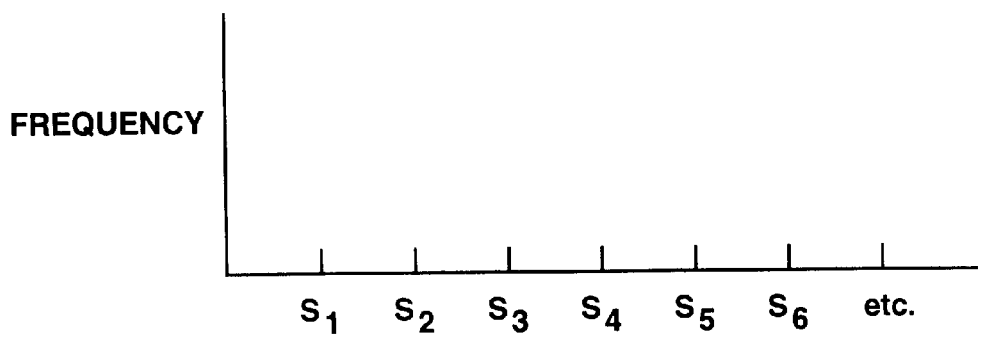
FIG. 5 illustrates a histogram according to the present invention.

The tuning system 1 provides a histogram, updated each sample interval, for each of four operations: sequential reads, random reads, sequential writes, and random writes. Each histogram contains the frequency of occurrence of its respective operation categorized by byte-range buckets. Referring to FIG. 5, an illustrative histogram for sequential writes is shown with byte buckets $s_1$–$s_6$. Each of the byte buckets contains the frequency of occurrence, during the last sample interval, of sequential writes for a different range of byte sizes. For example, bucket $s_1$ might indicate the number of sequential writes of 0–7 bytes during the last interval while bucket $s_2$ indicates the number of sequential writes of 8–15 bytes during that same interval.

FIG. 6 shows an illustrative computer program for implementing DC_ALG3a. Referring to FIG. 6, DC ALG3a determines the maximum byte bucket size used in the sequential read frequency histogram for the sample interval (find_seq_read_max( )) and sets an optimal value for sequential reads to that value ($S_{b-sr}$=$SR_{max}$). It then determines the maximum byte bucket size used in the sequential write frequency histogram (find_seq_write max( )) for the sample interval and sets an optimal value for sequential writes to that value ($S_{b-sw}$=$SW_{max}$).

The optimum value for random reads is based upon the mode(s) of the byte-bucket ranges in the random read frequency histogram (find_num_modes_rr(HIST_RR[ ]). If the distribution is unimodal ($NM_{rr}$==1), DC_ALG3a assigns the optimal value for random reads to the value of the mode's byte-bucket ($S_{b-rr}$=$RR_{mode}$=find_unimode (HIST RR[])). If the distribution is multimodal ($NM_{rr}$>1; i.e. local maxima), the algorithm sets the optimal value to the byte bucket value corresponding to the mode with the highest frequency of occurrence in the histogram ($S_{b-rr}$= find_best_multimode_rr($RR_{mode}$[])). If there is a "tie," the larger byte bucket is used. If there are no modes in the distribution, the byte bucket value associated with the median of the random read distribution is used (optimal_size=median_rr=find_median_rr(HIST_RR[])). The same procedure is used to find the optimal value for random writes (see /* random writes */).

Thus, DC_ALG3a has provided four (4) optimal cache buffer sizes, one optimal value for each of the four types of operations (sequential reads, random reads, sequential writes, and random writes). Since this algorithm operates on a homogenous cache geometry, these four values must be reduced to a single optimal cache buffer size.

In order to derive this single optimal value, the algorithm must first determine what percentage of the workload is associated with sequential reads (PercentSR=determine_percent_sr( )), random reads (PercentRR=determine_percent_rr( )), sequential writes (PercentSW=determine_percent_sw( );), and random writes (PercentRW=determine_percent_rw( )). If there exists a mode in the frequency distribution of the four operations (if (mode ==unimodal), then the size of the cache buffer is set to the optimal cache buffer size for the operation corresponding to the mode ($S_b$=optimal_size=size_of_final_mode). For example, if the unique mode is defined by sequential reads, then the optimal cache buffer size is set to $S_{b-sr}$.

If no single mode exists because all four operations show the same frequency of occurrence, then the optimal cache buffer size is set to the largest value from the four "optimal" values (optimal_size=find_max_size($S_{b-sr}$, $S_{b-sw}$,$S_{b-rr}$, $S_{b-rw}$)). For example, if $S_{b-sr}$=1K, $S_{b-rr}$=512, $S_{b-sw}$=4K, and $S_{b-rw}$=1K, the algorithm will set $S_b$=4K (the maximum value of the set of four).

If no single mode exists because three of the operations show the same frequency of occurrence, then the optimal cache buffer size is set to the largest value from these three "optimal" values (find_max_size($S_1$,$S_{b2}$,$S_{b3}$)). For example, if $S_{b-sr}$=1K, $S_{b-rr}$=512, and $S_{b-sw}$=8K, the algorithm will set $S_b$=8K (the maximum value of the set of three).

If no single mode exists because two the operations show the same frequency of occurrence, then the optimal cache buffer size is set to the largest value from these two "optimal" values (find_max_size($S_{b1}$,$S_{b2}$)). For example, if $S_{b-sr}$=1K, $S_{b-rr}$=512, the algorithm will set $S_b$=1K (the maximum value of the set of two).

b. Heterogeneous Geometry: DC_ALG3b

This algorithm determines the optimal size for a data cache buffer when cache buffers can be of different sizes. As in the homogeneous case described above, sequential reads tend to push the optimal cache size ($S_b$) towards ($SR_{max}$), sequential writes tend to push $S_b$ toward $SW_{max}$, random reads push $S_b$ towards a value of $RR_{mode}$ or a combination of the values of $RR_{mode}$[], and random writes push the values of $S_b$ toward $RW_{mode}$ or a combination of $RW_{mode}$[]. Moreover, DC_ALG3b, like DC_ALG3a, uses these values in its tuning operation. Since the heterogeneous cache geometry allows the data cache to be comprised of cache buffers of differing sizes, however, DC_ALG3b uses these values to synthesize 3 three discrete "buffer regions" in the data cache (although DC_ALG3b creates only 3 buffer regions, additional buffer regions could be added if desired).

FIG. 7 shows an illustrative computer program for implementing DC ALG3b. Referring to FIG. 7, DC ALG3b derives optimal values for sequential reads ($S_{b-sr}$), random reads ($S_{b-rr}$), sequential writes ($S_{b-sw}$), and random writes ($S_{b-rw}$) in the same manner as DC_ALG3a. For the heterogeneous cache geometry, however, these four values define three (3) regions of the data cache with an optimal cache buffer size ($S_b$[0], $S_b$[1], $S_b$[2]) for each region.

First DC ALG3b merges the sequential read size and the sequential write size into one region because they share the same tendencies towards buffer cache size. The merged optimal value ($S_{b-srsw}$) is set to the larger of the optimal sequential read value ($S_{b-sr}$) and the optimal sequential write value $S_{b-sw}$). The three regions defining the cache geometry are then set as follows: region 1 ($S_b$[0]) is set to the merged optimal value ($S_b$[0]=$S_{b-srsw}$); region 2 ($S_b$[1]) is set to the optimal random read value ($S_b$[1]=$S_{b-rr}$); and region 3 ($S_b$[2]) is set to the optimal random write value ($S_b$[2]=$S_{b-rw}$).

Once the buffer size for each of the three regions is set, the algorithm must determine how much of the total data cache should be devoted to each region. The algorithm first determined what percentage of the workload is associated with each of the sequential reads (Percent SR), sequential writes (Percent SW), random reads (Percent RR), and random writes (PercentRW) in the same manner as DC_ALG3a. It then assigns to the first region a percentage of the total data cache equal to the sum of the percentage of the workload associated with sequential reads and sequential writes (Percent[0]=PercentSR+PercentSW). The second region is assigned a percentage of the total data cache equal to the random read workload percentage (Percent[1]=Percent RR) and the third region is assigned a percentage of the total data cache equal to the random write workload percentage (Percent[2]=Percent RW).

The Tuning engine then sends the server a list of the three cache buffer sizes along with a list indicating what percent of total number of cache buffers each region should be assigned (send_hetero_cache($S_b$[], Percent [])).

4. Data Cache Flushing Intervals: DC ALG4 & DC ALG5

It is known in the art to "flush" a data cache periodically and/or upon the occurrence of specified events in order to efficiently operate the cache. "Flushing" of the data cache involves moving through a list of cache buffers and moving certain data to the host system's permanent storage devices. In accordance with the present invention, flushes are activated in order a) to satisfy a pre-defined (user-defined) criterion for data integrity (i.e. periodic flushes), b) to maintain a predetermined ratio between "clean buffers " (which contain un-modified data) and "dirty buffers" (which contain modified data) ("Clean/Dirty Buffer Ratio"), and c) to acquire usable data buffers needed for reads and writes ("Buffer Starvation").

The first type of cache flushing, the "periodic" flushing, is considered to be a necessary part of any data cache mechanism. It counters the volatility of the data in cache buffers with the stability and permanence of storing the data in a permanent storage device. The tuning engine 40 leaves this flushing interval to the discretion of the server's user. No tuning algorithms act on this flushing activity other than to simply differentiate periodic cache flushing rates from the overall cache flushing rates. In this regard, the tuning engine 40 monitors $N_p$, which is defined as the moving average (over the five most recent sampling intervals (sampling interval=60 seconds)) of the number of data cache buffer flushes per sampling interval initiated by a periodic flush mechanism in the server's data cache system.

a. Clean/Dirty Buffer Ratio: DC ALG4

The second type of cache flush, based upon the "Clean/Dirty Buffer Ratio," is controlled by DC_ALG4. This algorithm has a sampling interval of 60 seconds and an action interval equal to ten sampling intervals (600 seconds). The following variables will be used in describing the manner in which DC_ALG4 operates:

$N_{sr}$: the number of sequential reads performed by the server on behalf of client requests during the last sampling interval.

$N_{sr}[]$: array holding sequential read data for all sampling intervals (zeroed out after each action interval).

$N_{rr}$: the number of random reads performed by the server on behalf of client requests during the last sampling interval.

$N_{rr}[]$: array holding random read data for all sampling intervals (zeroed out after each action interval).

$N_{r\text{-}avg}$: the moving average (over the ten most recent sampling intervals of the number of reads performed by the server system on behalf of client requests.

$N_{sw}$: the number of sequential writes performed by the server on behalf of client requests during the last sampling interval.

$N_{sw}[]$: array holding sequential write data for all sampling intervals (zeroed out after each action interval).

$N_{rw}$: the number of random writes performed by the server on behalf of client requests during the last sampling interval.

$N_{rw}[]$: array holding random write data for all sampling intervals (zeroed out after each action interval).

$N_{w\text{-}avg}$: the moving average (over the ten most recent sampling intervals) of the number of writes performed by the server on behalf of client requests.

$N_f$: the number of data cache buffer flushes during the sampling interval which were initiated by an asynchronous flush mechanism in the server data cache system which tries to maintain a minimum ratio of the number of clean to the number of dirty buffers.

$N_{f\text{-}avg}$: the moving average (over the ten most recent sampling intervals) of the number of data cache buffer flushes per sampling interval initiated by an asynchronous flush mechanism in the file server data cache system which tries to maintain a minimum ratio of the number of clean to the number of dirty buffers.

$R_c$: the current value of the clean-to-dirty-buffer-ratio threshold.

$R_{prop}$: the proposed optimum value of the clean-to-dirty-buffer-ratio threshold.

DC_ALG4 serves two purposes: 1) to determine when the server is excessively flushing the data cache buffers (i.e., the clean/dirty buffer ratio is being violated); and 2) to determine an optimal value (which will minimize flushing) for the clean/dirty buffer ratio based upon the server's workload. DC_ALG4 utilizes the workload values determined by RTMP for DC_ALG3(*a* & *b*) to determine the optimum values for a clean-to-dirty-buffer-ratio threshold.

A data cache buffer is considered "dirty" if the data it contains has been modified as a result of a client request. A data cache buffer is considered "clean" if the data it contains has not been modified as a result of a client request. The optimum ratio of clean to dirty buffers will vary as the workload environment varies. A ratio of $R_c$=40% tells the server to maintain a ratio of 40 clean buffers to every 60 dirty buffers in the data cache and to flush data cache buffers to increase the number of clean buffers when the ratio drops below $R_c$.

Read requests will not cause flushing since they do not affect the clean to dirty buffer ratio. In contrast, write requests, which modify cache buffers, may cause the clean to dirty buffer ratio to drop below $R_c$, thereby initiating buffer flushing. Therefore, DC_ALG4 monitors the read and write requests over time and proposes values for $R_c$ which will tend to minimize cache flushing.

FIG. 8 shows an illustrative computer program for DC_ALG4. The algorithm tracks the moving average of read and write requests from clients via the real time workload monitoring conducted by the tuning system 1 and calculates the optimum clean/dirty buffer ratio based upon these values. DC_ALG4 maps the clean to dirty buffer ratio threshold ($R_c$) to mirror the ratio of read requests to total read/write requests in the workload spectrum. Thus, as the percentage of reads in the workload spectrum increases, so does the threshold $R_c$.

Referring to FIG. 8, the algorithm checks the flushing rate, the number of sequential reads, sequential writes, random reads, and random writes during each sampling interval (GetFlushingRateStats(&FlushStats)) and maintains a flushes v. time graph over a ten sample interval (UpdateGraph(numsample, FlushStats.$N_f$)). Every ten sample periods (if (NumSamples==10)), the algorithm calculates the average number of reads ($N_{r\text{-}avg}$=GetAverage(10 samples, &$N_{sr}[]$, &$N_{rr}[]$ )), the average number of writes ($N_{w\text{-}avg}$=GetAverage(10 samples, &$N_{sw}[]$, &$N_{rw}[]$ )), and the average number of flushes ($N_{f\text{-}avg}$=GetAverage(10 samples, $N_f$)). After these values are updated, the algorithm checks for two anomalies: 1) no flushing activity during last ten intervals; 2) saturation behavior in the flushing rate.

If there have been no flushes during the last ten sampling intervals ($N_{f\text{-}avg}$==NULL), then the clean to dirty buffer ratio is not altered.

DC_ALG4 checks the flushes v. time graph to determine whether there is saturation behavior in the growth of the flushing rate (CheckFlushRate( )). If there is saturation behavior, the flag ExpCheckOn is set and the threshold $R_c$ is decreased as follows: $R_c$ is set to a value $R_{prop}$, which equals $N_{r\text{-}avg}/(N_{r\text{-}avg}+N_{w\text{-}avg})$ if and only if $R_{prop}$ is less than $R_c$. If $R_{prop}$ is greater than or equal to $R_c$, $R_{prop}$ is set instead to 80% of $R_c$. The value $R_{prop}$ is then sent to the server as the new value for $R_c$. Moreover, once the threshold tendency flag ExpCheckOn is set, the flushing rate is monitored and the value $R_c$ decreased in this manner during every sampling interval until the flag is cleared.

If no anomalies were detected (there were flushes and the flag ExpCheckOn is not set) then the algorithm will determine an optimal value for $R_c$ based upon the read/write stream and return a value for $R_c$ equal to $N_{r\text{-}avg}/(N_{r\text{-}avg}+N_{w\text{-}avg})$ to the server (SendToSeNer(Rprop)).

b. Buffer Starvation: DC ALG5

The purpose of this algorithm is to monitor data cache availability and to maintain as close to 100% availability as possible. The sampling interval of this algorithm is 60 seconds and the action interval is five sampling intervals (300 seconds). The following variables will be used in describing DC_ALG5:

$N_s$: the number of data cache buffer flushes per sampling interval initiated by the buffer starvation flush mechanism in the server data cache system.

$N_{rw}$: the total number of read and write requests serviced by the server system during the last sampling interval.

CA: the percentage of time the data cache was available on demand for reads and writes during the last sampling interval: $100-((N_S/N_{rw})*100)$.

CA[]: an array of the cache availability values from the five most recent sampling intervals.

$CA_{avg}$: the moving average of the cache availability values from the five most recent sampling intervals.

The "data cache availability" value (represented as a percent), CA, measures the ratio of the number of times the data cache had to be flushed in order to free up a data cache buffer to satisfy a read or write request from a client to the total number of reads and writes from clients during a sampling interval. As previously stated, the purpose of DC_ALG5 is to maintain data cache availability at as close to 100% as possible.

Suppose that, during the last sampling interval, there were five cache flushes due to buffer starvation (buffer starvation occurs when the cache must be flushed to free up a data buffer to satisfy a client request) and during that interval there were a total of 100 reads and writes. The cache availability value calculated for that interval would be $100-((5/100)*100)$ or 95%. This indicates that, for 95% (or 95 in this case) of the reads and writes which occurred during that interval, the data cache offered the needed cache buffers on demand, but for 5% (5 in this case) of the reads or writes which occurred during the interval, the requests had to wait while the cache was flushed to free up the needed buffer(s).

The goal is to maintain a cache availability value of 100%. This is accomplished primarily by maintaining an appropriately large data cache size. In general, the size of the data cache is controlled by DC_ALG2. DC ALG5, however, monitors the data cache availability, and upon detecting a degradation in availability, issues an alarm to DC_ALG2 which causes DC_ALG2 to preempt its normal activity and take specified action to alleviate the degradation in cache availability. So DC_ALG5 tunes the server system's data cache by monitoring the cache availability, CA, and, when necessary, feeding an asynchronous alarm into the general data cache size tuning algorithm (DC_ALG2 :data cache size routine( )).

DC_ALG5 will be explained with reference to the illustrative computer program shown in FIG. 9. The algorithm keeps a window of the five most recent values of the cache availability (CA[1]–CA[5]) and determines whether there is a cache availability problem by examining the average of these values ($CA_{avg}$=GetAvgAvail(CA[])).

An average cache availability of over 90% is considered acceptable. Therefore, the flag IsStarving is set to false when CA>90 and no action is taken.

An average cache availability of less than 80% indicates a degenerate condition requiring immediate correction. Therefore, the algorithm sets the flag IsStarving to TRUE, the flag StarveCase to DEGENERATE, and sends these values asynchronously to DC_ALG2. Referring to FIG. 4, DC_ALG2 checks for asynchronous messages from DC_ALG5 during every sampling interval (CheckForStarvation( )). Since IsStarving is true and StarveCase is DEGENERATE, DC ALG2 immediately jumps to case (a) which, as discussed previously, implements a 100% increase in the cache size.

An average cache availability of between 80% and 90%, while still considered unacceptable, does not require such a severe response. Referring to FIG. 9, a cache availability in this range causes DC_ALG5 to set the IsStarving flag to TRUE and the StarveCase flag to NONDEGENERATE and to send these values asynchronously to DC_ALG2. Since the IsStarving flag is true, DC_ALG2 will interrupt its normal processing. However, since the StarveCase flag is not set to DEGENERATE, DC_ALG2 will not jump to case (a). Instead, it will correct the data cache size using its normal criterion (which is based on the hit ratio). However, as a result of the asynchronous signal from DC_ALG5, DC_ALG2 will act immediately rather than waiting for its normal action interval.

II. Macro-level Algorithms

The macro-level algorithms monitor the overall affect of the dynamic tuning implemented by the micro-level algorithms and provide the user with information regarding the overall functioning of the server and the effectiveness of the micro-level algorithms.

A. Performance Degradations/Saturations: MaLP-1

This macro-level algorithm assimilates all of the activity at the micro-level into a phase-space surface which is then used to:

a) judge the effectiveness of the micro-level activity;

b) present the micro-level activity to the user in a simple and coherent manner; and c) formulate propositions regarding future workload demands and server performance.

This phase-space surface is a three dimensional representation of the interaction among the workload, the server system, and the micro-level tuning algorithms (if they are in operation). The surface represents an x-y-z parametric phase space spanned by: an x-axis of values representing the workload, a y-axis of values representing a system resource characteristic such as CPU utilization, and a z-axis representing a performance characteristic of the server such as a system-generated value of the overall average response time of the server to a given workload. This surface associates a particular workload demand with a corresponding system resource expenditure and with a resulting performance metric. Any point in time, past, present, or future (to a certain degree) can be located on this surface by the vector associated with the triplet (Workload, System Resource, Performance). All of the micro-level activity is necessarily assimilated into this point. In fact it is the hidden micro-level activity by the tuning engine's dynamic tuning which modifies the shape of this surface through the server's response to workload demands.

Motion along this surface is analyzed by using standard mathematical techniques. This type of analysis allows the tuning system 1 to locate workloads in the phase space and identify its associated system resource and performance values. The surface can be generated by actual workloads and/or artificial workloads.

The average response time of the server is measured by a probe which is located in the tuning engine 40. As explained infra, the probe is a small application level program which performs selected primitive operations on the server and measures the response time of the server to those operations. Since the probe is an application level program, the response time will approximate the actual response time of the server to client requests. While the server is operating under an actual workload, the probe performs primitive operations on the server and the response time of the server to those operations is used to generate an average response time of the server for that particular workload. The resource consumption value for the workload is sampled from the server. In this manner, a three dimensional phase space is generated using actual workloads.

In order to form a more comprehensive phase space, however, the present invention provides additional probes in various clients in the network and uses these probes, along with the tuning system 1 probe, to generate an artificial workload. During a period of low network activity, e.g. midnight, the present invention will use the probes to generate a wide spectrum of workload values and then measure the resulting response times and resource consumption. In this manner, the present invention can establish a fairly comprehensive surface around any particular workload. The system can then use this surface to answer performance and capacity questions as functions of workload for any server system for which a corresponding phase space has been generated.

1. The X-axis: Workload Characteristic

An enumeration technique implemented by the tuning system 1 provides a one-to-one mapping of the workload to a unique identifier value which is used to identify any particular workload on the graph. The tuning system's definition of a workload is based upon the average arrival rates of file server primitives (which are sampled from the server via RTMP). During a sampling interval, the tuning system 1 uses its RTMP (workload) to tabulate the average arrival rates of the following primitive requests from clients: sequential and random reads, sequential and random writes, file opens, file closes, directory searches, byte-range locks, file creates, and "other". These values form a vector which defines the workload for that interval: ($n_{seq\ read}$, $n_{ran\ read}$, $n_{seq\ write}$, $n_{ran\ write}$, $n_{open}$, $n_{close}$, $n_{create}$, $n_{lock}$, $n_{search}$, $n_{other}$). Any workload, either real or artificial, can be described by a vector of this form. The tuning system 1 takes a given workload vector and maps it to an unique value using a mapping function.

The mapping function takes a workload vector in $R^n$ (n equals the number of workload primitives associated with the workload vector) and maps it to a scalar in $R^1$. The scalar is then taken as the "x" coordinate in the MaLP-1 phase space. The mapping function is needed to map vectors which are "close" in $R^n$ to scalars which are "close" in $R^1$. Collisions (i.e., two vectors in $R_n$ mapped to one value in $R_1$) are allowed if the mapping function produces collisions only with workload vectors which are very similar (i.e., the colliding workloads represent similar workloads in terms of the distributions and frequencies of the primitive operations represented by the components of the vectors).

The following mapping function used in the tuning system 1 produces the desired results. The tuning system 1 utilizes the inner product of two vectors defined as <M,N>= ||M|| ||N|| cos(theta), where "theta" is equal to the angle between the vectors M and N.

"Theta" is the angle between the vectors in $R^n$ as well as $R^2$ because $R^n$ is essentially "two dimensional" in the sense that the system is concerned with only two vectors, M and N. These two vectors, although each has n coordinates, together span a plane subspace inside $R^n$. This subspace can be regarded as basically the same as the standard plane $R^2$; the subspace is just a "copy" of $R^2$ tilted inside some larger $R^n$. The tuning system 1 takes each workload vector in $R^n$ and computes, using the inner product, the angle "theta" between the selected workload vector and a reference vector (which defaults as the basis in $R^n$ of (1,0,0, . . . ,0)). This value of "theta" is the mapping of the workload vector from $R^n$ to the $R^1$ phase space of MaLP-1. The following procedure is repeated for each workload vector in $R^n$ while maintaining the same reference vector in $R^n$.

i) select a reference vector in $R^n$: the default is the $R^n$ basis (1,0,0, . . . 0)=Y ii) select a workload vector in $R^n$: Wa=($w_1, w_2, \ldots, w_n$)

iii) compute the angle "theta" between $W_a$ and Y by solving:

$$\arccos \frac{<W_a, Y>}{||W_a|| ||Y||} = theta$$

$W_a$ = a vector which defines the workload at time $t_a$
$W_a$ = ($SR_a, RR_a, SW_a, RW_a, O_a, C_a, S_a, L_a, Cr_a, Ot_a$)
$W_a$ = 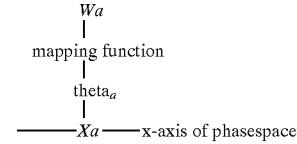 Mapping Function ⟶ $X_a$ $X_a$ = an unique value to which is mapped $W_a$ in such a way that $W_a$ is to be the only workload which is mapped to $X_a$

```
         Wa
          |
   mapping function
          |
        theta_a
          |
 ——————Xa——————x-axis of phasespace
``` iv) if, after mapping all of the workload vectors in $R^n$ onto the $R^1$ workload axis in the MaLP-1 phase space, the system detects collisions (different workload vectors mapped to the same value in $R^1$), the tuning system 1 must verify that the collisions are of "similar" workloads (workloads with similar distributions and frequencies of component primitive operations). If 95% or more of the collisions are of this type, the tuning system 1 will continue with the analyses since it is permissible for similar workloads to collide. Similar workloads should fall near to each other in $R^1$. Collisions of "similar workloads" are treated as extreme cases where the distance between points approaches zero.

v) if more than 5% of the collisions are of "dissimilar" workloads (workloads whose distributions and frequencies of component primitive operations are quite different in pattern), the tuning system 1 will change the reference vector used in the calculation of the "theta" values to a different basis in $R^n$ (there are n of these reference vectors); recompute the mapping values of "theta;" and recheck for collisions as in "iv" and "v". If, after exhausting the reference vectors of bases, the unfavorable collision condition persists, the tuning system 1 will calculate the center of mass in $R^n$ of the workload vectors (assigning each vector a unit mass)

and use this center of mass vector as the reference vector in calculating the "theta" values. If the unfavorable collision condition persists, the tuning system 1 will use the "theta" mapping with the least percentage of unfavorable collisions.

2. The Y-axis: System Resource Characteristic

The tuning system 1 associates to every workload a corresponding consumption of system resources needed to satisfy the workload demands. The system incorporates into its RTMP's a monitoring process which tracks system resource consumption. Each workload vector in $R_n$ (and $R_1$ as a result of the workload mapping function) has a single corresponding resource consumption vector which is plotted on the Y-axis. Thus, the system maps to each workload a resource consumption value which the system tracks as it tracks workload demands. For example, if CPU utilization is used as the resource characteristic, the percent CPU utilization is plotted on the Y-axis as a function of workload demand.

3. The Z-axis: Performance Metric

The z-axis represents the macro-level manifestation of the micro-level activity of the tuning algorithms. In an illustrative embodiment of the present invention, the tuning system 1 uses the average response time of the server to client requests (RT), which is measured by the probe(s) as discussed below, as the performance metric mapped on the z-axis. In this context, "hills" in the phase space represent performance degradations (higher average response times) in the server system and "valleys" represent performance improvements (lower average response times).

4. Performance/Capacity Analyses Using The Phase Space

In accordance with the present invention, one or more "probes" are used to measure the response time of the server under differing workloads. The probes are small application programs that perform selected primitive operations on the server and measure the response time of the server in response to commands from the tuning engine 40. In general, probes will be provided in the tuning engine 40 and in several clients in the client population. It is possible, however, to use only a single probe located, for example, in the tuning engine 40. In the illustrative embodiment of the present invention shown in FIG. 1, a central probe 95 is located in the tuning engine 40 and client probes 98 are located in various clients 10 in the client population 20. The tuning system 1 can send a probe to a client by utilizing, for example, a PATHWORKS "Showserv" utility (a product of Digital Equipment Corporation). Alternatively, the probes can be manually installed in a client via the client's disk drive.

The probes are generally application programs which run in a client that is simultaneously performing its normal functions (e.g. running a Wordperfect™ word processing program). However, a probe could also be a dedicated hardware device capable of responding to the commands of the tuning system 1. In any case, since a probe is an application running in the client (or a device which simulates an application running in a client), the response time measured for a server is the actual response time that would be seen by an application in the client, i.e. the actual amount of time it would take to satisfy client requests.

The probes serve a dual purpose in the tuning system 1. While the system is operating under an actual workload generated by client requests, the probes monitor the response time of the server to that workload. Since the probes only implement a few primitive operations, the workload generated by the probes does not significantly tax the resources of the server. Therefore, the measured response time accurately reflects the response of the server to the client generated workload. In addition, the probes can be used to create an artificial workload by increasing the frequency and magnitude of the probe's primitive operations. In this manner, the probes can be used to map out an entire phase space for a given server. The nature of the probes and the manner in which they gather response time information is discussed in detail in copending application Ser. No. 08/050,929 which is hereby incorporated by reference.

The tuning engine 40 can assign a set of probes in the network to act as loading stations on a given server system. By issuing commands from the tuning system 1, the present invention can regulate the operation suites (sequences and average arrival rates of file server primitive operations) directed at the server in such a manner that the controlled stream of operations define a workload over a period of time. In other words, the operation suite over a period of time can be characterized by a Workload Vector (SR, RR, SW, RW, O, C, S, L, Cr, Ot) which is reduced to a unique identifier value $W_{nid}$, a System Resource Vector (ex: CPU % consumed to satisfy the work demands over the time interval), and a Performance Vector (ex: average overall Response Time). Thus, for a given workload generated by the set of probes, a vector is generated using the resource and performance metrics previously described: Workload$_n$-----> ($W_{nid}$, CPU$_n$, RT$_n$).

This vector ($W_{nid}$, CPU$_n$, RT$_n$) is then plotted in the phase space. The Workload Vector (SR, RR, SW, RW, O, C, S, L, Cr, Ot) is then adjusted to represent a different workload demand: Workload Vectornew=(SR+dSR, RR+dRR, SW+dSW, RW+dRW, O+dO, C+dC, S+dS, L+dL, Cr+dCr, Ot+dOt) and the process is repeated with the resultant vector ($W_{newid}$, CPU$_{new}$, RT$_{new}$) plotted in the phase space. In this way, the tuning system 1 can, over a period of time, generate a set of vectors in the phase space which can be used to determine a three-dimensional surface topology of the performance/capacity characteristics of the server. In a network which includes several servers, the procedure can be repeated for each server on the network, resulting in characteristic surfaces for each server.

During the normal periods of operation for any given server, the tuning system 1 will update the phase space with new data vectors which are composed of workload, resource, and performance metrics gathered by tuning system 1 in real-time. These vectors are added to the phase space and the surfaces are updated to reflect the constant assimilation of real-time information. Moreover, the system can provide the user with a performance trajectory of the server which shows the path that the server (in terms of workload/capacity/performance) has taken across the surface.

Because the surface topology is in part reflective of the application of the tuning engine's tuning recommendations to the server, the "base" topology of the surface might change significantly if the tuning changes move the server to a state which is drastically different (performance-wise) than previous states. In this case, sections of the performance trajectory through the phase space (the path of actual values across the surface) as well as parts of the general surface topology will be invalidated. This would necessitate a redefinition of the phase space surface by repeating the original sequence of operation suites from the client probes.

However, it is entirely possible that only a subset of the surface is significantly impacted and needs redefinition. To address this problem, the tuning system 1 periodically validates a set of randomly selected workloads in the phase space. If the projections of the vectors (Workload, Resource, Response Time) for these selected workloads are not significantly different than their projections during the previous validation period, the tuning system 1 concludes that the performance/capacity phase space is still valid despite the dynamic tuning of the server. If, however, the vector projections are significantly different than the projections during the previous validation period, the system notifies the user of the metric of difference and asks the user if the system should continue its analyses or, in the alternative, begin the surface redefinition process.

5. Interpreting The Phase Space Surfaces

The phase space surface is a macro-level representation of the underlying relationships among workload demands, resource consumption, performance characteristics, and applied tuning. Any workload defined during the operation of a server while it was being monitored by the tuning system 1 will be locatable in the phase space. In addition to the real-time workloads, probe-driven workloads are plotted which add comprehensiveness to the surface. The tuning system 1 locates the current actual workload and tracks the server's motion over the phase space surface as the actual workload changes with time (the performance or workload trajectory).

By examining the contours of the phase space surface around the path of the workload trajectory (the path of actual workloads over time), the tuning system 1 can address questions regarding performance. Since the tuning recommendations from the tuning system 1 to the server help to shape the performance and resource consumption dimensions in the phase space, the tuning system 1 can, by examining the immediate geometry around the point on the surface representing the current workload, and the direction the workload has been moving over time, attempt to predict the server's performance with respect to a future workload. Once the system predicts a future workload, it locates this projected point in the phase space, and uses this phase space position to estimate what the performance characteristics will be if the actual workload reaches this estimated position. In short, the tuning system 1 uses this methodology to demonstrate to the user where the system has been, where the system is, and where the system seems to be heading.

B. Examining Entropy in the File Server System: MaLP-2

In the context of the present invention, "entropy" denotes a measure of the ability of the server 30 to maintain a consistent level of service to the clients 10 despite changes in the workload. The micro-level activity within the server 30, which is generated in reaction to the changes in the workload, is manifested at the macro-level as performance metrics. These performance metrics can be used to quantify the entropy within the server system. In accordance with an exemplary embodiment of the present invention, the amount of "entropy" in the server system is quantified by calculating a value proportional to the entropy of the server system based upon the performance history over time (time-variant) of the service being provided to the clients 10. In the context of the present invention, a higher entropy value indicates a higher degree of internal disorder in the server system with regard to its ability to process client requests in a consistent, timely, coherent manner.

The MaLP-2 macro-level algorithm uses the average response time (the average, at a time, t, of the response times of all server primitive operations measured by the probes) to generate a two-dimensional, $R^2$, phase space which is used to examine entropy patterns in server behavior. Techniques for constructing phase-space pictures from the observation of a single coordinate of any dissipative dynamical system are discussed in Packard, et al., "Geometry from a Time Series", Physical Review Leners, 45/9, 1980.

Figures 10, 13:
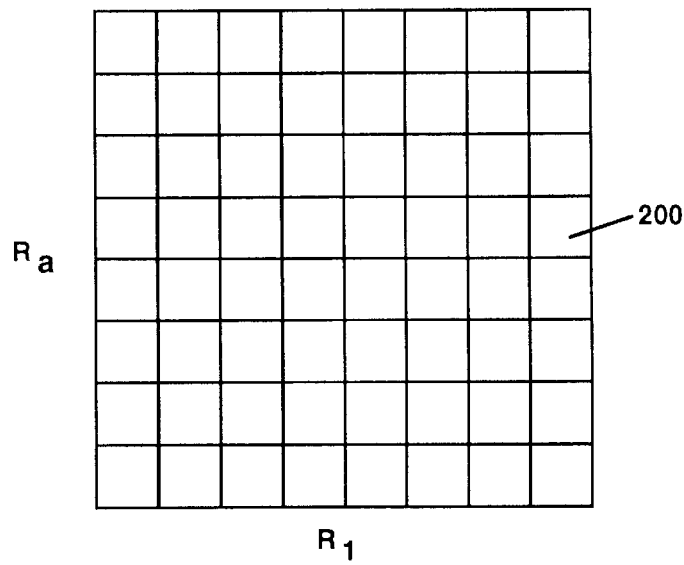
FIG. 10 is a graph illustrating the manner in which the system according to the present invention monitors the entropy of a server.
FIG. 13 is a table which illustrates response time triplets used in the graph of FIG. 12.

MaLP-2 monitors the average response time of the server over time and generates a two dimensional graph representative of the entropy of the server. Referring to FIG. 10, MaLP-2 monitors entropy in the server by examining pairs of response times values; i.e. two consecutive response times as measured by a single probe. The algorithm generates a graph whose X-axis is the most recently sampled average response time, $RT_1$, and whose Y-axis is the preceding response time, $RT_2$. Therefore, if the tuning system 1 gathers n average response time values, the points will be plotted on the graph as follows:

(RT[1], RT[1])
(RT[2], RT[1])
(RT[3], RT[2])
.
.
.
(RT[n], RT[n − 1]

Referring to FIG. 10, the system phase space of the graph is divided into grid boxes 200 as follows:

First, the system must establish a response time saturation value. The response time saturation value $RT_{sat}$ is defined as the response time at which the server begins to exhibit saturation behavior. $RT_{sat}$ can be determined for any given server by utilizing the probes to artificially alter the server's workload and measuring the resulting response time to determine the point at which the server's performance begins to exhibit saturation behavior. The manner in which saturation behavior is identified in discussed below in Section II(C). Alternatively, $RT_{sat}$ can be defined as any response time which the system manager or central user determines to be a maximum permissible value.

The system then defines a unit of length, $RT_{len}$, where $RT_{len}=RT_{sat}/n$. While "n" can be set to any value, it will be defined as n=10 for purposes of this discussion. Thus, $RT_{len}=RT_{sat}/10$. The graph is divided into grid boxes having sides of length $RT_{len}$. Each grid box defines a "macrostate."

As response time values are received by the tuning system 1, response time pairs (RT1, RT2) are plotted on the graph. Since the server's response time should be fairly consistent over time, all the points on the graph, under optimal conditions, should fall into a single macrostate (grid box). Therefore, the entropy of the system increases as the number of occupied macrostates increases.

The tuning system 1 assigns each grid-box an id, "i", starting from O to "n" thereby creating macrostates "0" through "n." From the plot of the ordered pairs $(RT_t, RT_{t-1})$ overlaid onto the grid box, the number of points in each grid box is counted and the ratio of (number of points in grid box "i")/(total number of points) is taken as the probability, $P_i$, of finding the server in macrostate "i."

The entropy, S, is proportional to:$-(SUM_i(P_i \log P_i))$. Since the present invention is concerned with detecting an increase in entropy and not in determining an actual value for the entropy, the constant of proportionality is ignored for purposes of this analysis and $S=-(SUM_i(P_i \log P_i))$.

The system tracks the entropy values over time and stores these values as a set of ordered pairs $(t, S_t)$. The ordered pairs are plotted on a graph of S v. t and monitored for indications of saturation behavior. If saturation behavior is detected, the system user is notified of a potential problem in the server. The user can then examine the stored response time and entropy values and investigate the source of the problem.

C. Capacity Degradations/Saturations: MaLP-3

Figure 11:
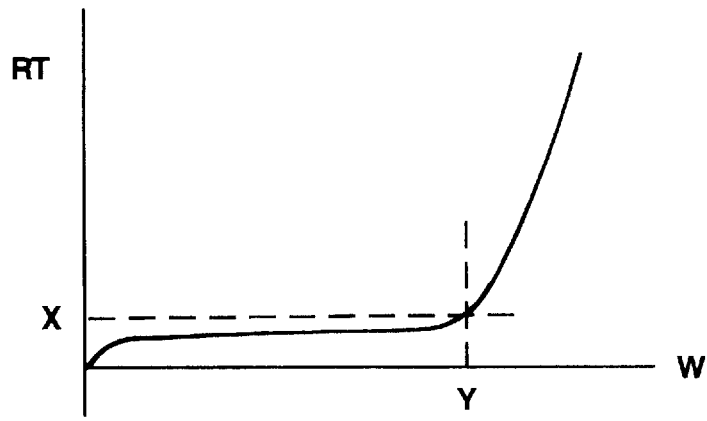
FIG. 11 is a graph which illustrates the manner in which a server's performance varies with its workload.

Another feature of the present invention sets an alarm for the central user or system manager when the response time of a server, considered as a whole, indicates that the server is approaching saturation behavior, i.e. a suddenly decreasing level of performance. This feature will be explained with reference to FIGS. 11 and 12. The manner in which a server's performance varies with its workload is shown in FIG. 11. With regard to any server, there exists a point x,y after which the response time of the server begins to increase suddenly as the workload increases. This point is sometimes referred to as the "knee" of the curve and indicates the beginning of saturation behavior. For obvious reasons, this is a very undesirable condition. Saturation behavior by a server can be counteracted by altering the workload or server parameters to move the server's performance back into an area of linear behavior. If the tuning engine 40 is currently implementing dynamic tuning on the server in question, saturation behavior indicates to the user that the tuning algorithms are not having the desired effect.

An exemplary method of determining the "knee" or saturation point of the curve of FIG. 11 will now be illustrated. The workload of the server is varied and the corresponding response times are calculated to form n workload/response time pairs (($W_1$, $RT_1$) through ($W_n$, $RT_n$)) which can be plotted on the graph of FIG. 11. The knee of the curve (point x,y) is calculated as follows:

1) calculate an average slope:

$$m_{avg} = (W_n - W_1)/(RT_n - RT_1); \text{ and}$$

2) calculate n–2 local slopes, $m_2 - m_{n-1}$, where $$m_2 = (W_3 - W_1)/(RT_3 - RT_1) \text{ and}$$

$$m_{n-1} = (W_n - W_{n-2})/(RT_n - RT_{n-2})$$

The knee (or saturation point) of the curve is the one of the n points, x, which satisfies each of the following conditions $m_x = m_{avg} \pm 5\%$; $m_{x-1} <= m_{avg}$; and $m_{x+1} > m_{avg}$.

In accordance with the present invention, a single probe is chosen (generally the probe in the tuning engine 40) and probe data with regard to the server is obtained as described previously. The tuning system 1 determines when a server is approaching saturation behavior by examining "triplets" of measured response times ($RT_1$, $RT_2$, $RT_3$), i.e. three consecutive response times, from the probe. A response time saturation value $RT_{sat}$ is defined as the response time at which the server begins to exhibit saturation behavior. As described above, $RT_{sat}$ can be determined for any given server by utilizing the probes to artificially alter the server's workload and measuring the resulting response time to determine the point at which the server's performance begins to exhibit saturation behavior.

Two types of saturation response time values can be identified: a) a saturation point of the average response times where the aggregate value is formed from a weighted average of the primitives with each primitive being assigned an equal weight (an absolute saturation value), or b) a saturation point of the average response times where the aggregate value is formed from a weighted average of the primitives with each primitive's weight proportional to the primitive's relative frequency in the server's workload distribution of primitive operations (a relative value). Which type of saturation value is used in the analyses is decided upon by the system user. In any event, it is this weighted average of the response times of primitive operations which is used to determine the $RT_{sat}$ value. Alternatively, $RT_{sat}$ can be defined as any response time which the system manager or central user determines to be a maximum permissible value.

Figure 12:
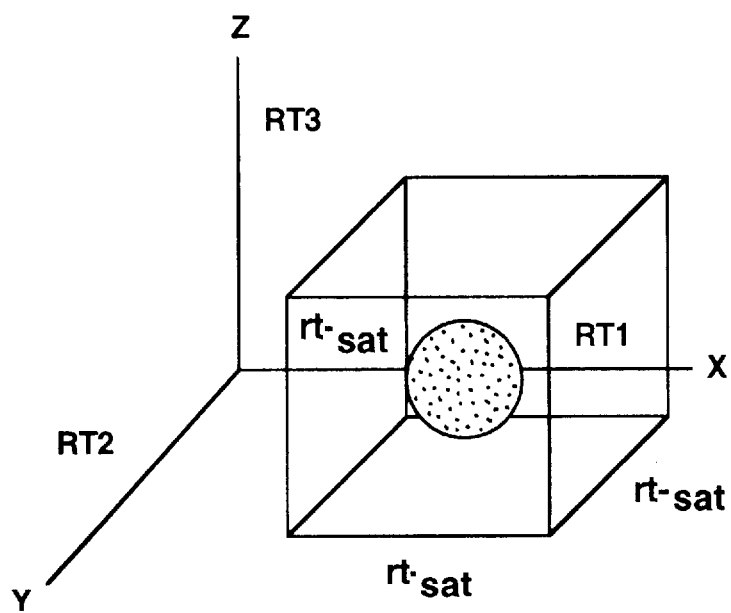
FIG. 12 is a graph which illustrates a server saturation alarm system of the present invention.

Referring to FIG. 12, there is shown a graph with $RT_1$, $RT_2$, and $RT_3$ as the x, y, and z axes, respectively. Each sequential set of 3 response time values creates a triplet as shown in FIG. 13. Each triplet forms a single point on the graph. The maximum permissible response time forms a cube with the length of the sides being equal to $RT_{sat}$, as shown. It has been empirically determined that the set of triplets measured over time will typically be bounded by a sphere of radius $r_b$. The center of the sphere (which also defines the center of the cube) can be determined, for example, by computing the arithmetic mean of the triplet values calculated over a period of time. The radius, $r_b$, can then be defined as the distance from the most recent triplet value (or from the average position of a set of recent triplet values) to the center of the sphere.

In accordance with an embodiment of the present invention, the sphere is formed as follows. First, the tuning system 1 must reduce the set of points on the graph to a central point or "center of mass" in order to geometrically center the sphere and the bounding cube. For a set of "i" points distributed on the graph, each point $(x_i, y_i, z_i)$ is defined as having a unit mass ($m_i = 1$). The center of mass $(x_c, y_c, z_c)$ of these points is determined as follows:

i) $x_c = [(m_1 * x_1) + (m_2 * x_2) + \ldots + (m_i * x_i)]/(m_1 + m_2 + \ldots + m_i)$ ii) $y_c = [(m_1 * y_1) + (m_2 * y_2) + \ldots + (m_i * y_i)]/(m_1 + m_2 + \ldots + m_i)$ iii) $z_c = [(m_1 * z_1) + (m_2 * x_2) + \ldots + (m_i * z_i)]/(m_1 + m_2 + \ldots + m_i)$ The center of the sphere is then set to the center of mass $(x_c, y_c, z_c)$.

The radius of the sphere is calculated as follows: The tuning system 1 calculates the distance from $(x_c, y_c, z_c)$ to the most recent data point in the distribution $(x_i, y_i, z_i)$ using the distance formula in $R^3$: $d_i = \text{sqrt}[(x_1 - x_c)^2 + (y_i - y_c)^2 + (z_i - z_c)^2]$. This produces the distance from the center of mass of the distribution to the most recent position of the server in the phase space. The radius of the sphere, $r_b$, is set equal to this distance, $r_b = d_i$, and the equation of the sphere is defined as: $(x - x_c)^2 + (y - y_c)^2 + (z - z_c)^2 = r_b^2$.

MaLP-3 uses the volumes of the sphere and cube generated in this phase space to determine the current and maximum capacity utilizations of the server. The volume of the bounding cube is interpreted as an indicator of the maximum capacity of the server to do work: ($C_{max} = V_{cube} = (RT_{sat})^3$. The volume of the sphere is interpreted as an indicator of how much of the maximum capacity is being used at time "t": $C_t = V_{sphere} = (4/3) * (\text{pi}) * (r_b)^3$. Thus, the ratio of $C_t/C_{max}$ is reported by MaLP-3 to the user as a metric of current server capacity utilization.

In accordance with the present invention, the rate at which the sphere is approaching the cube is identified and reported as the rate at which the server is approaching saturation behavior. MaLP-3 attempts to determine a) the rate at which $C_t$ is changing and b) the rate at which $C_t$ is approaching $C_{max}$. The bounding cube is set be co-centric with the capacity sphere at $(x_c, y_c, z_c)$. Thus, both the cube and the sphere are translated to a frame of reference about $(x_c, y_c, z_c)$. Since $(x_c, y_c, z_c)$ is constantly being recalculated by MaLP-3, this translation is performed at each sampling interval.

The rate at which $C_t$ is changing, $dC_t/dt$, is a measure of the rate at which the server is using up its available resources. This rate is calculated as follows:

i) keep an array of the ordered pairs $(C_t, t)$ for a designated time period of interest;

ii) find a "best-fit" curve through the graph of the ordered pairs such that $f(t)=C_t$; and iii) differentiate f(t) at the time in question to get the value of $dC_t/dt$, i.e. the rate at which the volume of the sphere is changing at time t.

It is known that the rate at which the volume of a sphere is changing and the rate at which the radius of the sphere is changing are related. Thus it can be shown that:

$$dC_t/dt=(dC_t/dr_b)*(dr_b/dt)$$
$$dC_t/dt=(4/3)*pi*3*(r_b)2*(dr_b/dt)$$

so, $$dr_b/dt=1/(4*pi*r_b^2)*dC_t/dt$$

$dC_t/dt$, which was calculated in above, can be plugged into this equation and the value for $dr_b/dt$ (the rate at which the capacity sphere is changing with time) can be determined. The tuning system 1 uses this value to predict a time, $t_{sat}$, when the server will reach its predefined saturation point if the workload remains relatively constant. The tuning system 1 estimates that the saturation point will be reached at the time, $t_{sat}$, when the value of $r_b$ changing at the rate of $dr_b/dt$ will equal the value of $RT_{sat}$ (in other words when the sphere reaches tangency with the cube). Assume, for example, that the current value of $r_b$ equals 5 ms, $r_{sat}$ equals 6 ms and the current value of $dr_b/dt$ equal 0.1 ms/hr. Assuming the workload remains constant, the server will reach saturation in 10 hours. Therefore $t_{sat}=10$ hrs.

As a result, the tuning system 1 can set an alarm indicating that the server is approaching saturation behavior when $t_{sat}$ drops below a certain threshold. The system will also set an alarm when the sphere intersects the cube to indicate when the server has entered the saturation region. In a system including several servers, the above described process can be performed with respect to each server in the system thereby forming a separate graph and triggering a separate alarm for each server. Moreover, since this process uses only the response time values generated by the probes, the process can also be performed on servers which are not configured to allow dynamic tuning.

What is claimed is:

1. A method of operating a data cache, comprising the steps of:

maintaining clean and dirty data buffers in the data cache, clean buffers containing only data received from a backing store containing a copy of the data, dirty buffers containing data received from a data source other than the backing store and intended to be written to the backing store but not yet so written;

monitoring the ratio of clean buffers to the sum of clean and dirty buffers in the data cache;

maintaining a data cache flushing threshold $R_c$ representing a minimum desirable ratio of clean buffers to the sum of clean and dirty buffers;

flushing dirty buffers from the data cache to the backing store in response to the condition that the ratio of clean buffers to the sum of clean and dirty buffers in the data cache is less than $R_c$;

periodically monitoring the following statistics pertaining to operation of the data cache: (a) a flushing rate representing the rate at which dirty buffers are being flushed from the data cache to the backing store, and (b) the numbers of read operations and write operations received by the data cache in the most recent monitoring period;

calculating an average read rate $N_{r-avg}$ and an average write rate $N_{w-avg}$ from the monitored numbers of read and write operations;

determining whether the flushing rate is exhibiting saturation behavior;

for the following sets of conditions, performing the corresponding steps:

if the flushing rate has changed over a first number of preceding periods but is not exhibiting saturation behavior, then setting $R_c$ to a new value equal to the ratio of $N_{r-avg}$ to the sum of $N_{r-avg}$ and $N_{w-avg}$;

if the flushing rate is exhibiting saturation behavior, then setting $R_c$ to a new value equal to either (i) the ratio of $N_{r-avg}$ to the sum of $N_{r-avg}$ and $N_{w-avg}$, if that ratio is less than $R_c$, or (ii) 80% of $R_c$ otherwise; and if the flushing rate has not changed over the first number of preceding periods, then refraining from changing the value of $R_c$.

2. A method of operating a data cache, comprising the steps of:

initializing a flag variable OK_TO_INCREASE to TRUE;

periodically determining a moving average hit ratio $R_{avg}$ for the data cache over a first number of preceding periods;

periodically determining a cache availability ratio CA representing one minus the ratio of the number of times the data cache had to be flushed to free a buffer to satisfy a read or write request to the total number of read and write requests during the most recent period;

calculating an average cache availability ratio $CA_{avg}$ equal to the average value of CA over a first number of most recent sampling periods;

for the following cases of the calculated value of $CA_{avg}$, performing the corresponding steps as follows:

$0 \leq CA_{avg} \leq 80\%$: if the size of the data cache is less than a maximum size $S_{max}$, then increasing the number of buffers in the data cache to the lesser of twice the number of buffers in the cache during the present period and a maximum number $N_{ht}$ of buffers contained in the data cache when the data cache size is $S_{max}$; and $80\% < CA_{avg} \leq 90\%$: for the following cases of the determined value of $R_{avg}$, performing the corresponding steps as follows:

$0 \leq R_{avg} \leq 50\%$: if the size of the data cache is less than $S_{max}$, then increasing the number of buffers in the data cache to the lesser of twice the number of buffers in the cache during the present period and $N_{ht}$;

$50\% < R_{avg} \leq 80\%$: (a) determining the data cache hit ratio for each of a second number of preceding periods; (b) setting the OK_TO_INCREASE flag to FALSE if the hit ratio over the second number of preceding periods has not substantially change; (c) setting the OK_TO_INCREASE flag to TRUE if the hit ratio has decreased over any of the second number of preceding periods; (d) if the OK_TO_INCREASE flag is TRUE and the size of the data cache is less than $S_{max}$, then increasing the number of buffers in the data cache to the lesser of 1.25 times the current number of buffers and $N_{ht}$;

80%<$R_{avg}$≦90%: (a) determining the data cache hit ratio for each of a third number of preceding periods; (b) setting the OK_TO_INCREASE flag to FALSE if the hit ratio over the third number of preceding periods has not increased monotonically; (c) setting the OK_TO_INCREASE flag to TRUE if the hit ratio has decreased over any of the third number of preceding periods; (d) if the OK_TO_INCREASE flag is TRUE and the size of the data cache is less than $S_{max}$, then increasing the number of buffers in the data cache to the lesser of 1.10 times the current number of buffers and $N_{ht}$; and 90%<$R_{avg}$≦100%: leaving the number of buffers in the data cache unchanged.

* * * * *